United States Patent
Wills

(10) Patent No.: US 12,498,081 B2
(45) Date of Patent: Dec. 16, 2025

(54) SUPPORT SYSTEM FOR COMPUTING DEVICE DISPLAYS

(71) Applicant: CMD Limited, Rotherham (GB)

(72) Inventor: Andrew Wills, London (GB)

(73) Assignee: CMD Limited, Rotherham (GB)

( * ) Notice: Subject to any disclaimer, the term of this patent is extended or adjusted under 35 U.S.C. 154(b) by 170 days.

(21) Appl. No.: 18/570,060

(22) PCT Filed: Feb. 22, 2021

(86) PCT No.: PCT/US2021/018965
§ 371 (c)(1),
(2) Date: Dec. 13, 2023

(87) PCT Pub. No.: WO2022/177575
PCT Pub. Date: Aug. 25, 2022

(65) Prior Publication Data
US 2024/0200715 A1    Jun. 20, 2024

(51) Int. Cl.
*F16M 11/20*    (2006.01)
*F16M 13/02*    (2006.01)
(52) U.S. Cl.
CPC ........ *F16M 11/2021* (2013.01); *F16M 13/02* (2013.01); *F16M 2200/044* (2013.01)
(58) Field of Classification Search
CPC ........... F16M 2200/044; F16M 13/022; F16M 11/2092; F16M 11/2042
See application file for complete search history.

(56) References Cited

U.S. PATENT DOCUMENTS

| | | | |
|---|---|---|---|
| 9,074,721 | B2 | 7/2015 | Lau |
| 9,316,346 | B2 | 4/2016 | Lau |
| 10,914,420 | B2 * | 2/2021 | Hung ................. F16M 11/2092 |
| 2003/0075653 | A1 | 4/2003 | Li |
| 2010/0327129 | A1 | 12/2010 | Chen |
| 2018/0112820 | A1 | 4/2018 | Lau |
| 2018/0372268 | A1 | 12/2018 | Hung |
| 2020/0063910 | A1 | 2/2020 | Hung |

OTHER PUBLICATIONS

International Search Report and Written Opinion of international application No. PCT/US2021/018965, mailed Jun. 2, 2021, 9 pp.

* cited by examiner

*Primary Examiner* — Bradley Duckworth
(74) *Attorney, Agent, or Firm* — Greenberg Traurig, LLP

(57) ABSTRACT

A support for a computing device display includes an upper arm, a lower arm, and a joint connecting the upper arm and the lower arm. The upper arm and the lower arm are rotatable with respect to one another about a longitudinal axis of the joint. The upper arm is rotatable with respect to the joint about a first axis orthogonal to the longitudinal axis of the joint. The lower arm is rotatable with respect to the joint about a second axis orthogonal to the longitudinal axis of the joint.

7 Claims, 24 Drawing Sheets

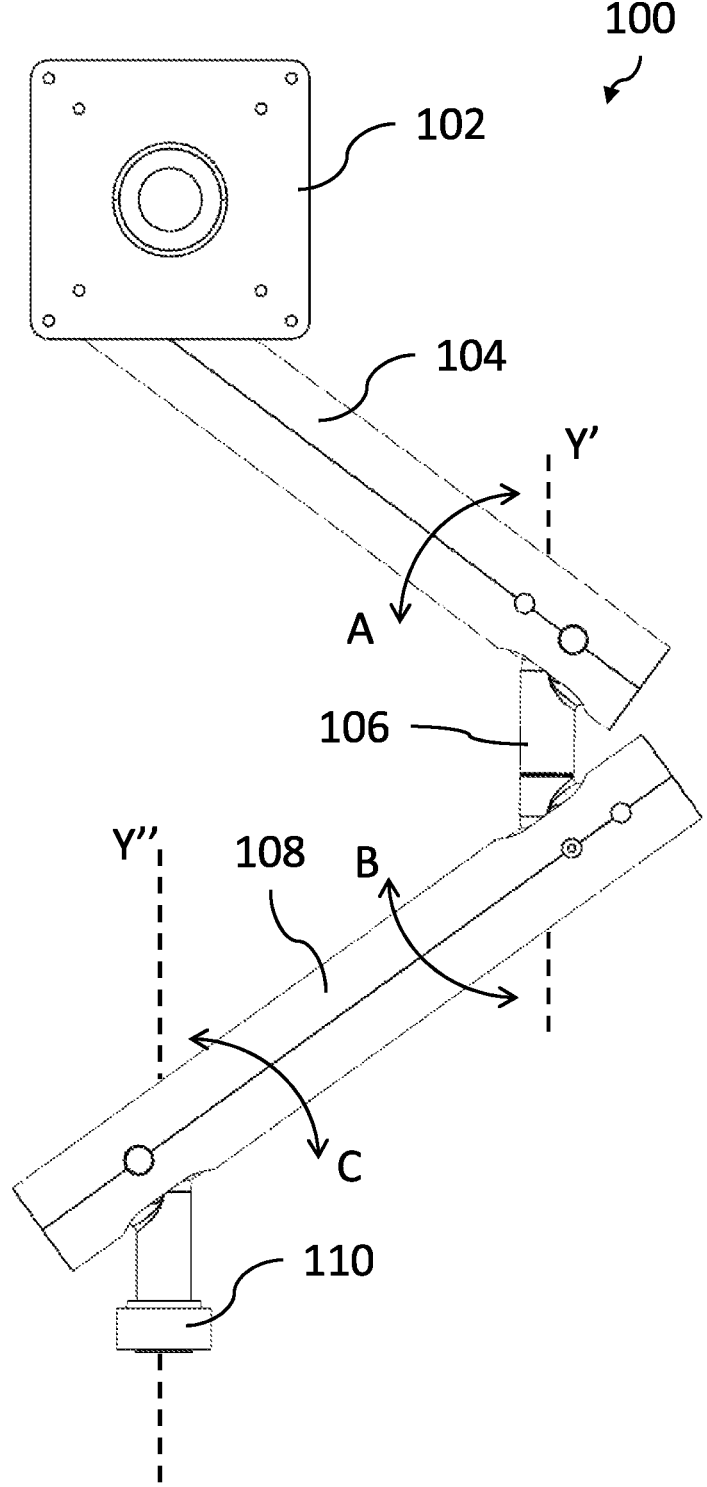

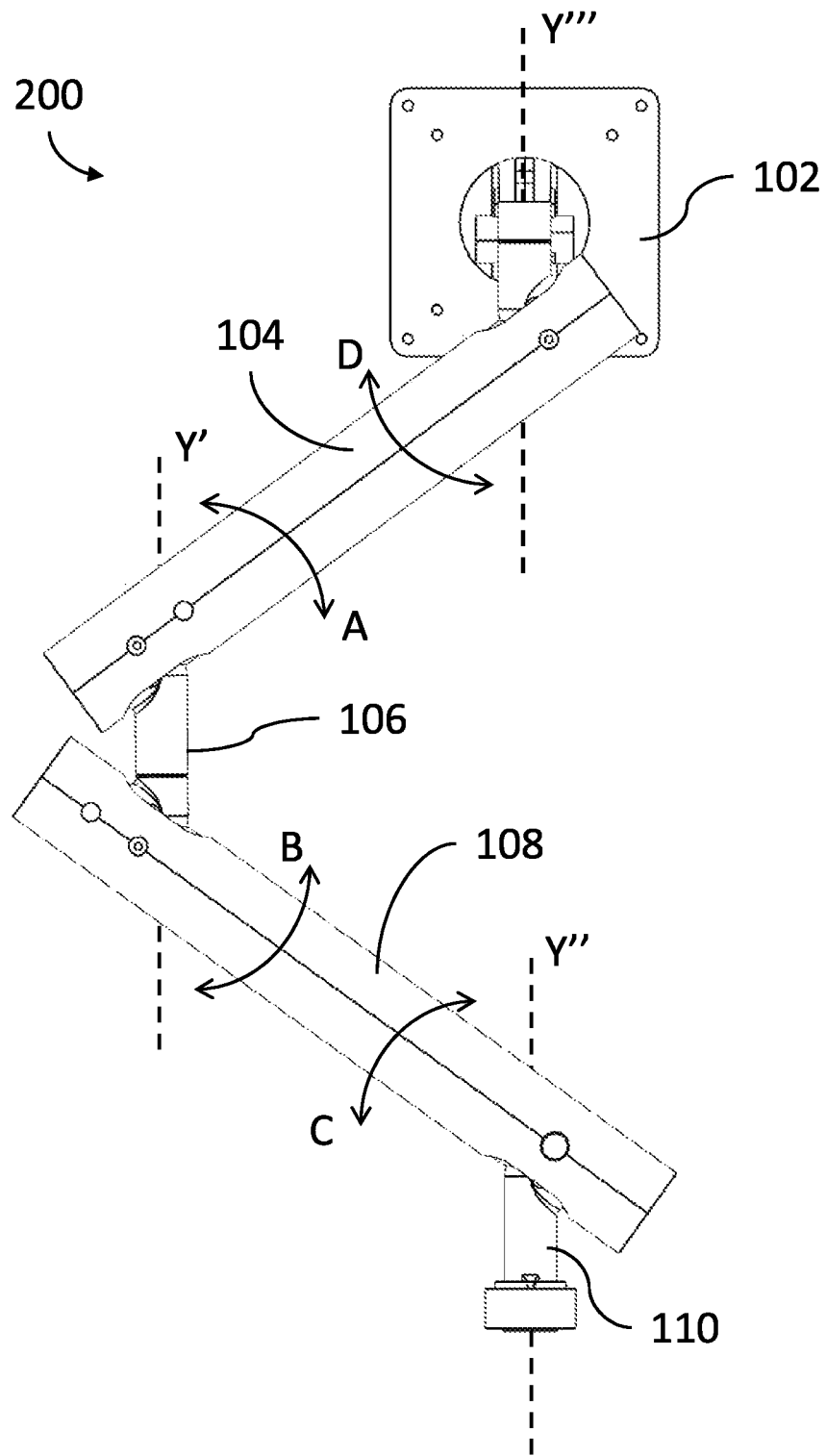

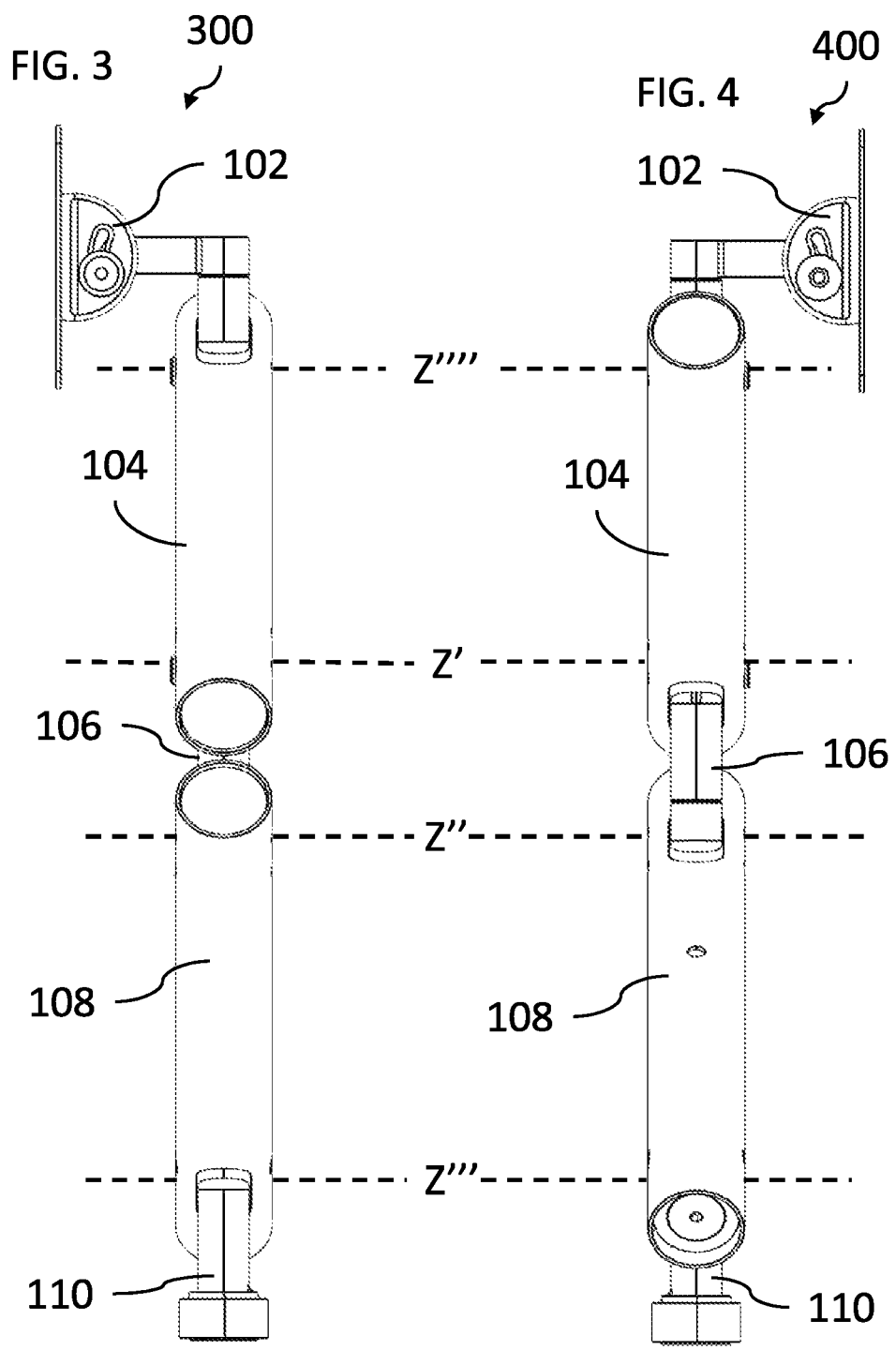

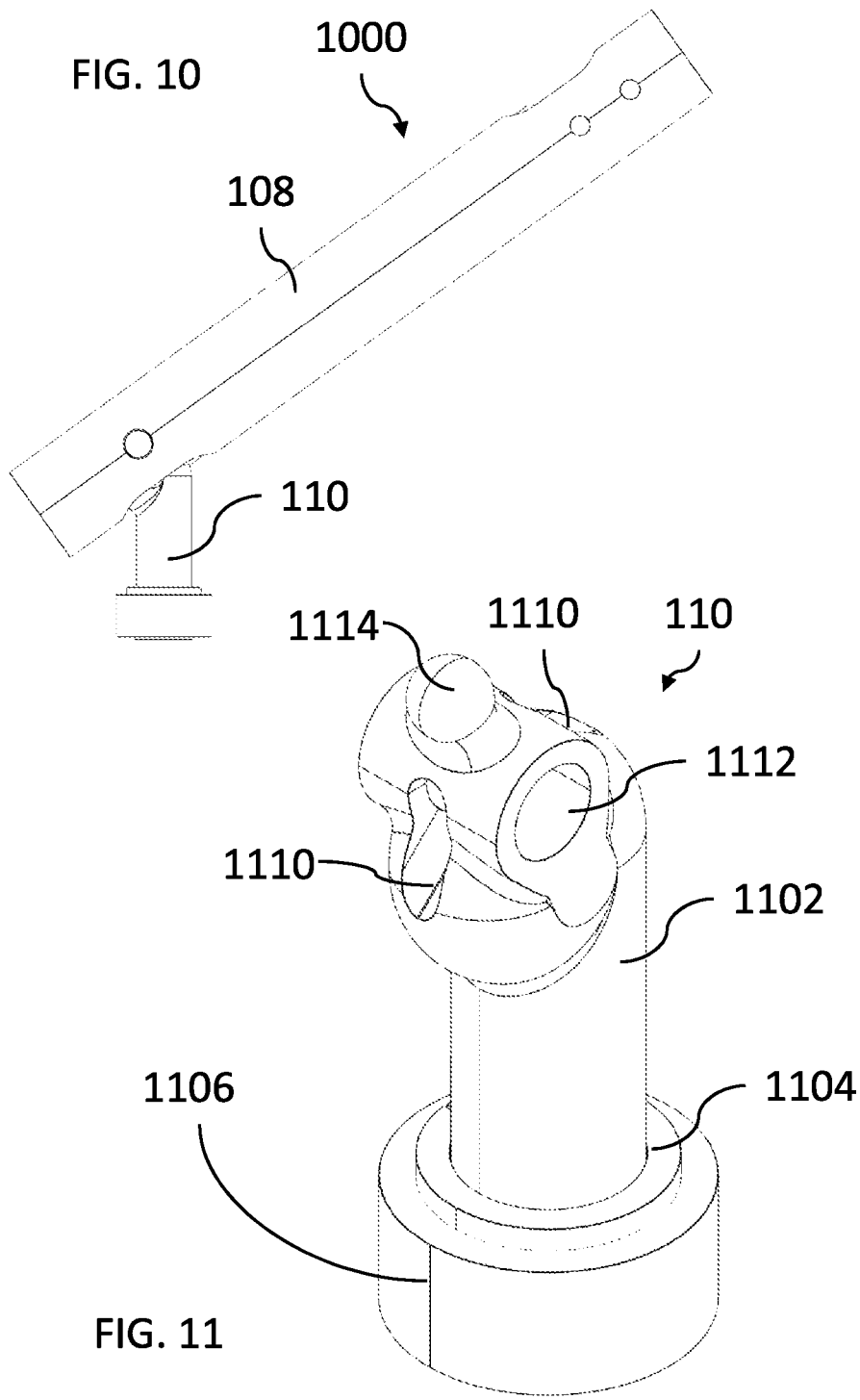

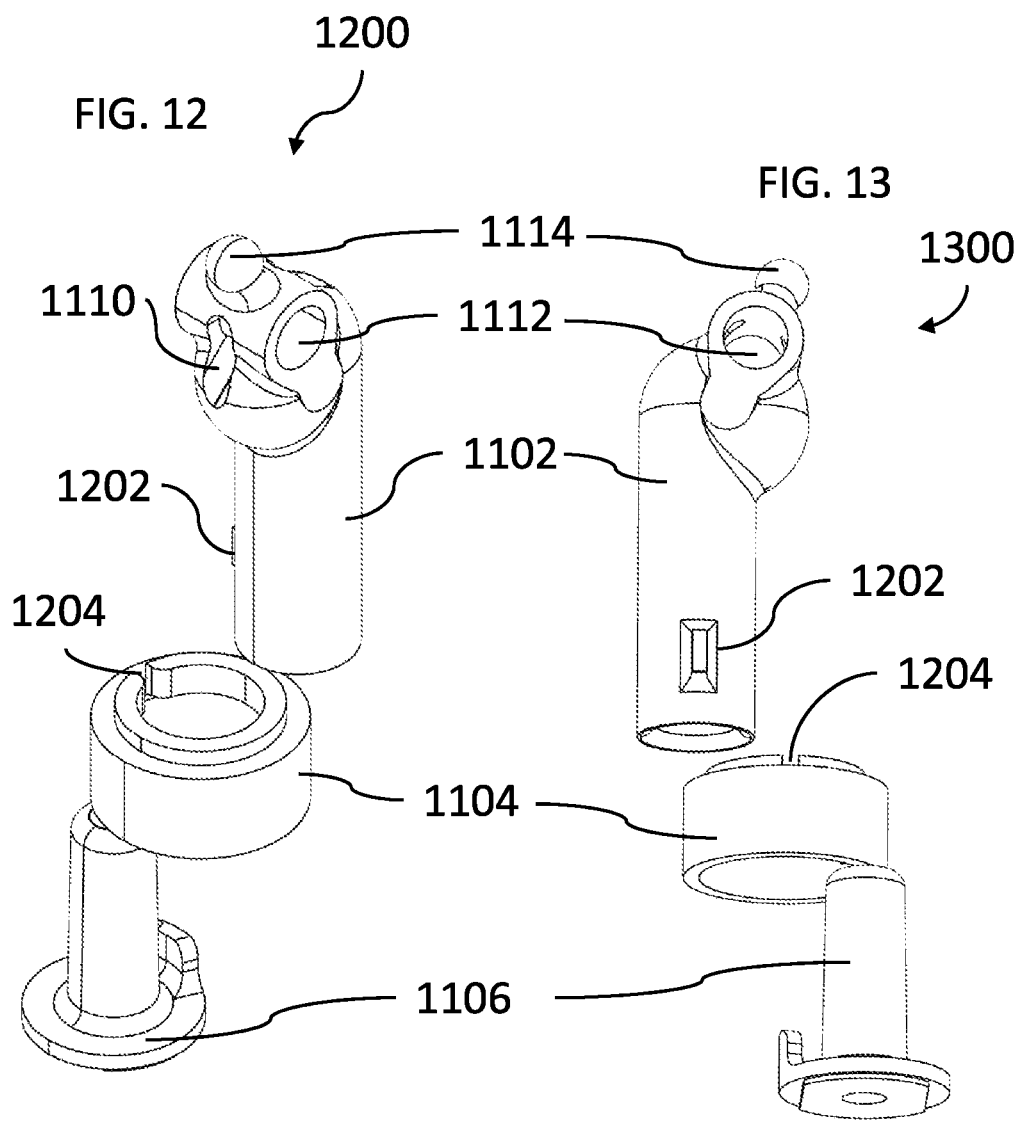

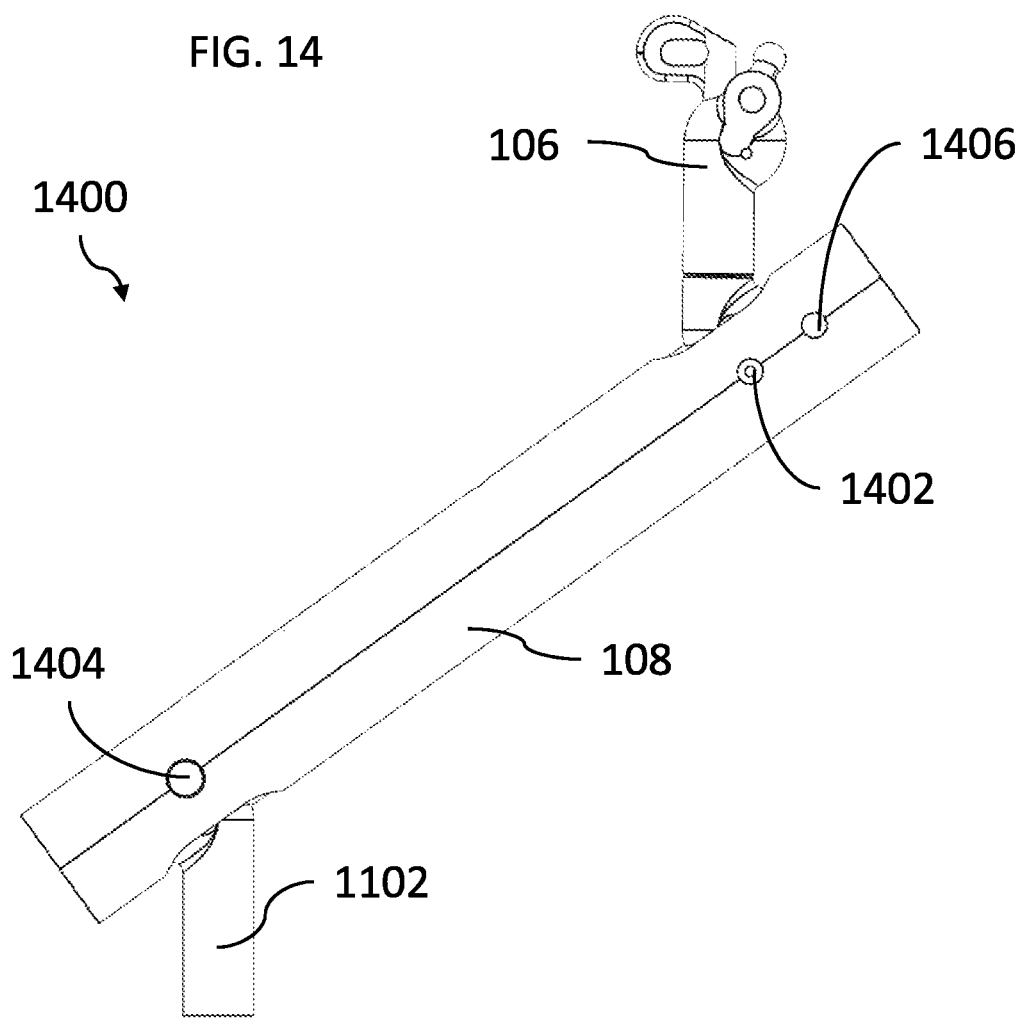

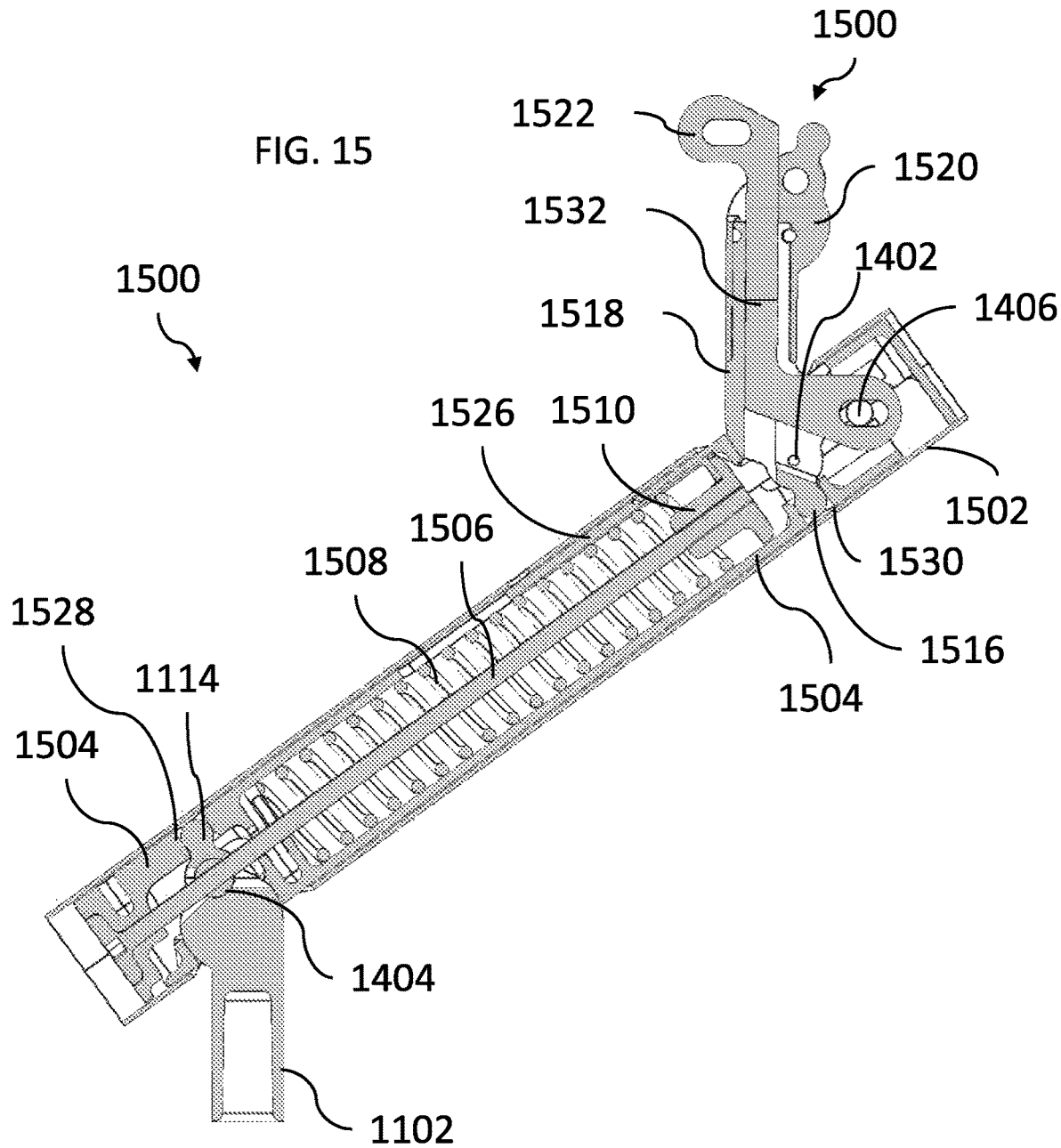

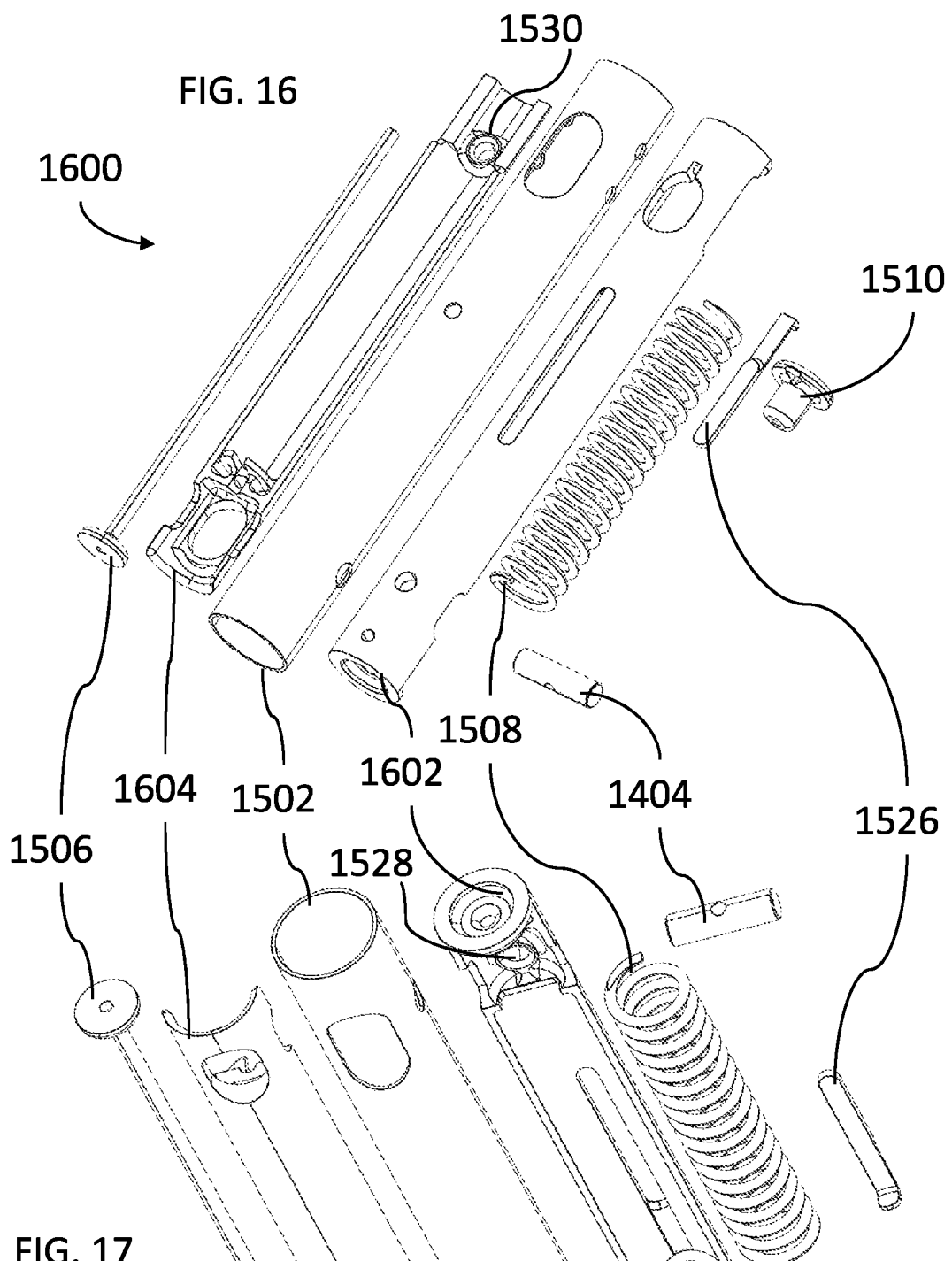

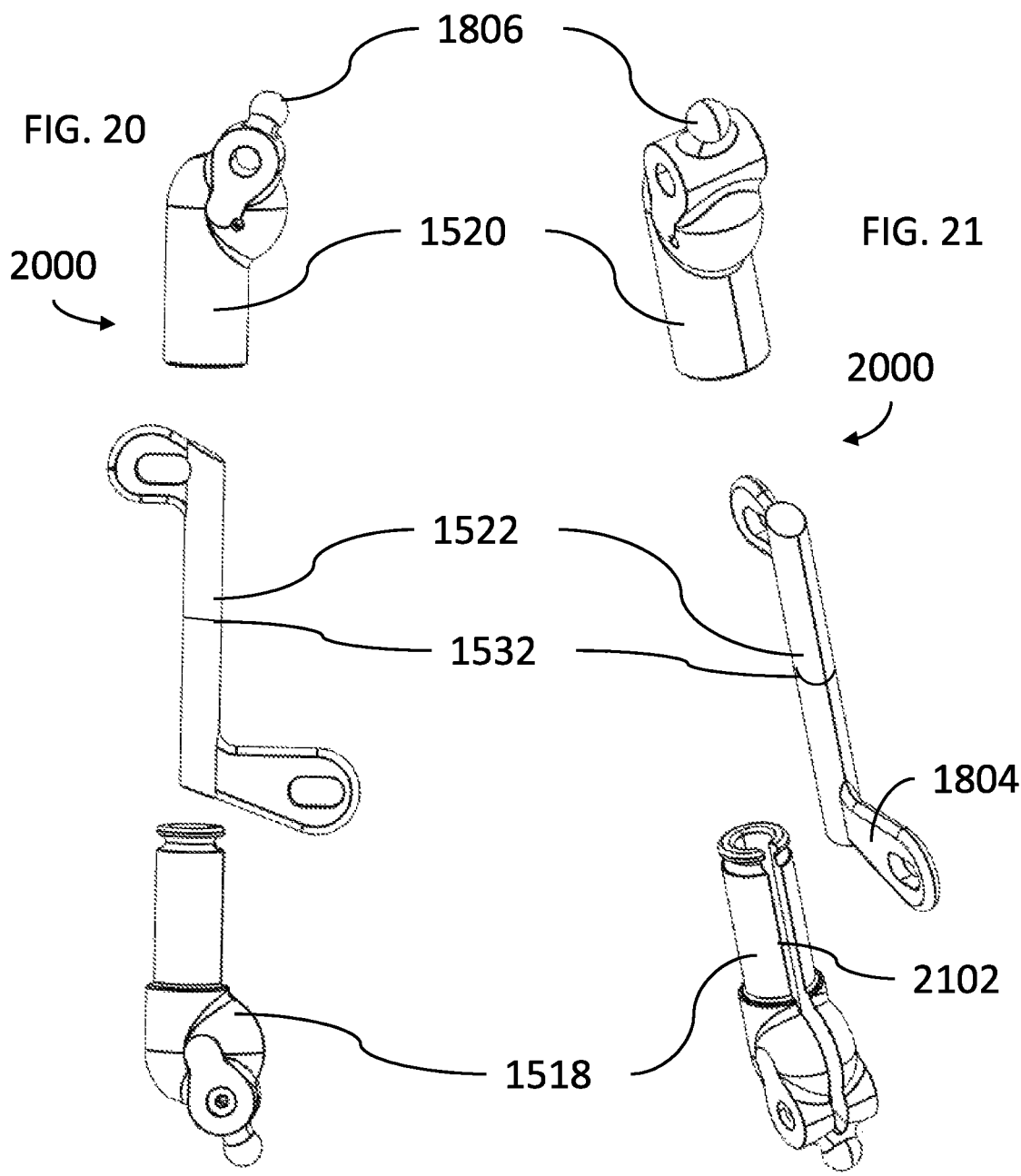

SUPPORT SYSTEM FOR COMPUTING DEVICE DISPLAYS

FIELD OF THE DISCLOSURE

The present description relates generally to support structures and more particularly to adjustable mechanical support arms for electronic devices such as computer monitors or displays.

BACKGROUND

Various types of computing devices, including desktop computers, have monitors or displays for displaying information to a user. Users may desire a particular placement of their monitor or display to facilitate ease of use of the monitor or display, improve posture when looking at the monitor display, or otherwise accommodate the preferences of a user. Accordingly, adjustable monitor stands may be used to adjust the placement, height, angle, orientation, etc. of a monitor or display of a computing device.

Two such example support systems for electronic device components are shown in U.S. Pat. Nos. 9,316,346 and 9,074,721, each of which are incorporated herein by reference in their entirety.

SUMMARY

An embodiment of a support for a computing device display includes an upper arm, a lower arm, and a joint connecting the upper arm and the lower arm. The upper arm and the lower arm are rotatable with respect to one another about a longitudinal axis of the joint. The upper arm is rotatable with respect to the joint about a first axis orthogonal to the longitudinal axis of the joint. The lower arm is rotatable with respect to the joint about a second axis orthogonal to the longitudinal axis of the joint.

An embodiment of a joint for a support includes a first end configured to attach to an upper arm of the support. The joint further includes a second end configured to attach to a lower arm of the support. The first end and the second end are rotatable with respect to one another about a longitudinal axis of the joint. The first end is configured to permit rotation of the upper arm with respect to the joint about a first axis orthogonal to the longitudinal axis of the joint. The second end is configured to permit rotation of the lower arm with respect to the joint about a second axis orthogonal to the longitudinal axis of the joint.

BRIEF DESCRIPTION OF THE DRAWINGS

FIG. 1 is a front elevational view of an example support system for computing device displays, in embodiments.

FIG. 2 is a rear elevational view of the example support system of FIG. 1, in embodiments.

FIG. 3 is a right side elevational view of the example support system of FIG. 1, in embodiments.

FIG. 4 is a left side elevational view of the example support system of FIG. 1, in embodiments.

FIG. 10 is a front side elevational view of a lower arm and base of the example support system of FIG. 1, in embodiments.

FIG. 11 is a perspective view of the base of the example support system of FIG. 1, in embodiments.

FIG. 12 is a first exploded perspective view of the base of the example support system of FIG. 1, in embodiments.

FIG. 13 is a second exploded perspective view of the base of the example support system of FIG. 1, in embodiments.

FIG. 14 is a front side elevational view of the lower arm and a middle joint of the example support system of FIG. 1, in embodiments.

FIG. 15 is a cross-sectional view of the lower arm and the middle joint of the example support system of FIG. 1, in embodiments.

FIG. 16 is a first exploded perspective view of the lower arm of the example support system of FIG. 1, in embodiments.

FIG. 17 is a second exploded perspective view of the lower arm of the example support system of FIG. 1, in embodiments.

FIG. 20 is a first exploded perspective view of the middle joint of the example support system of FIG. 1, in embodiments.

FIG. 21 is a second exploded perspective view of the middle joint 106 of the example support system of FIG. 1, in embodiments.

DETAILED DESCRIPTION

The following description of example methods and apparatus is not intended to limit the scope of the description to the precise form or forms detailed herein. Instead the following description is intended to be illustrative so that others may follow its teachings.

Described herein are apparatuses and systems for improved supports for computing device displays or monitors. The supports may include, for example, a lower arm and an upper arm joined by a middle joint. The lower and upper arms may advantageously rotate about different axes, providing flexibility to a user to adjust the computing device display as desired.

The lower and upper arms described herein may be configured to move synchronously and simultaneously with respect to one another, such that a wide range of movement and motion is possible with each of the lower and upper arms. As one example, the joint between the upper and lower arms described herein may permit the upper and lower arms to rotate a full 360 degrees with respect to one another, where the rotation occurs around an axis orthogonal to the ground or a desktop surface (or stated another way, the axis of rotation may be parallel to a gravitational force). In addition, regardless of how the upper and lower arms have been rotated with respect to one another to locate a display over a desk, for example, the upper and lower arms may both move synchronously and simultaneously to adjust a height of the display without displacing the display laterally. As such, this improved support for a display or monitor offers users increased ease of use, flexibility, and customization over past supports.

Various figures below are used to further show and describe example support systems and apparatuses. While certain examples are described herein, these examples are not limiting, as various different physical components and configurations of those components may be used to implement the support systems described herein. With respect to the specific examples discussed herein, FIGS. 1-25 are related to a first example support system, FIGS. 26-34 demonstrate how a second example support system may be moved and adjusted by a user, and FIG. 35 shows additional example middle joints that may be used in the support systems described herein.

Figure 5:
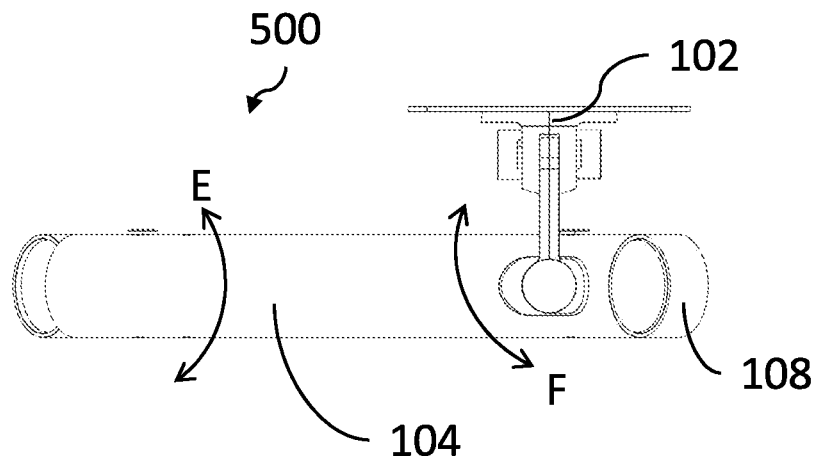
FIG. 5 is a top plan view of the example support system of FIG. 1, in embodiments.
Figure 6:
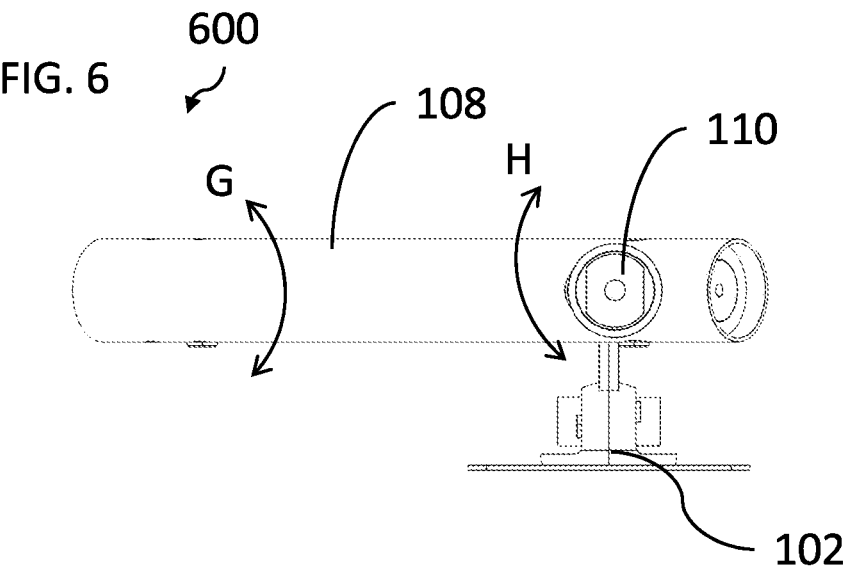
FIG. 6 is a bottom plan view of the example support system of FIG. 1, in embodiments.
Figure 7:
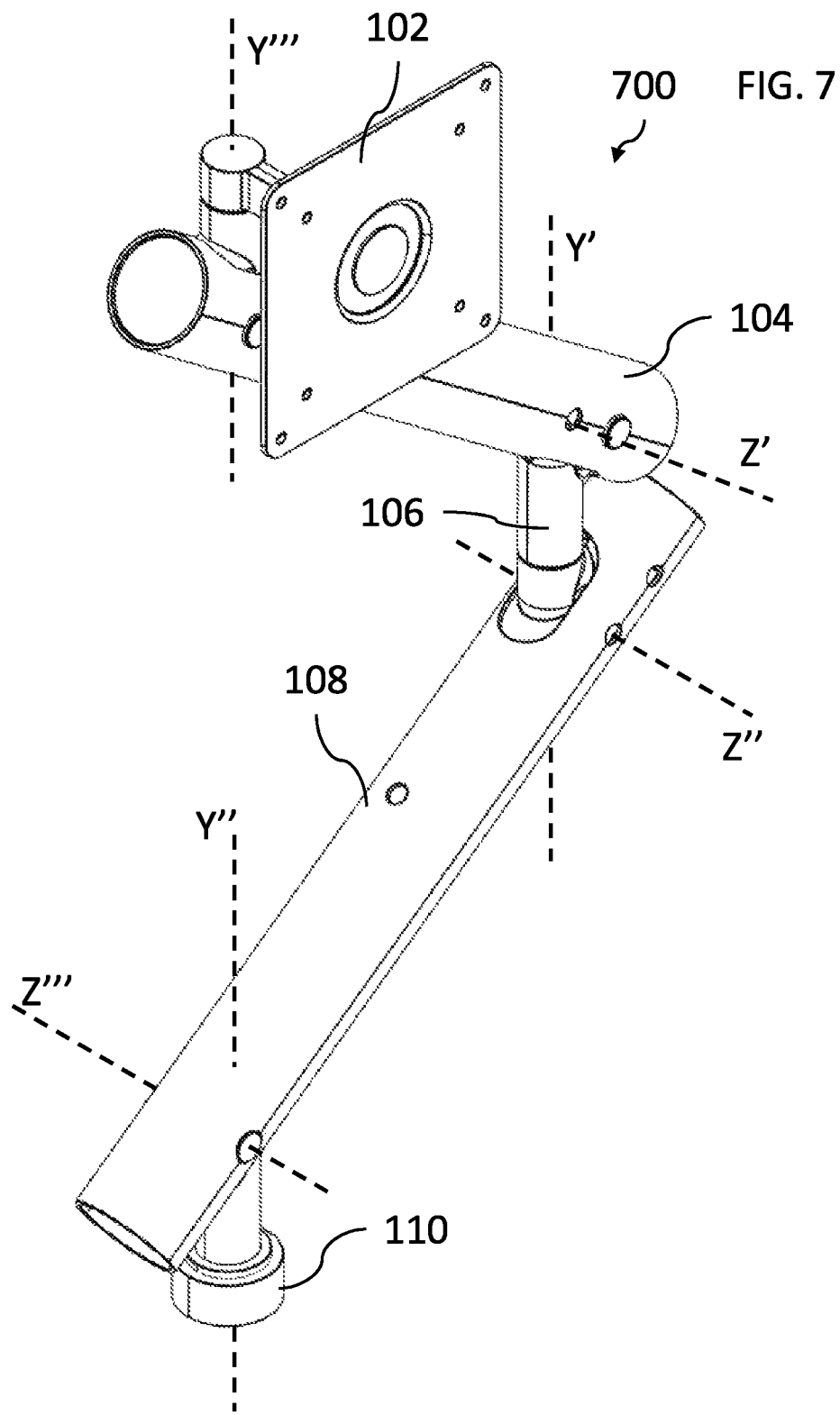
FIG. 7 is a front-left perspective view of the example support system of FIG. 1, in embodiments.
Figure 8:
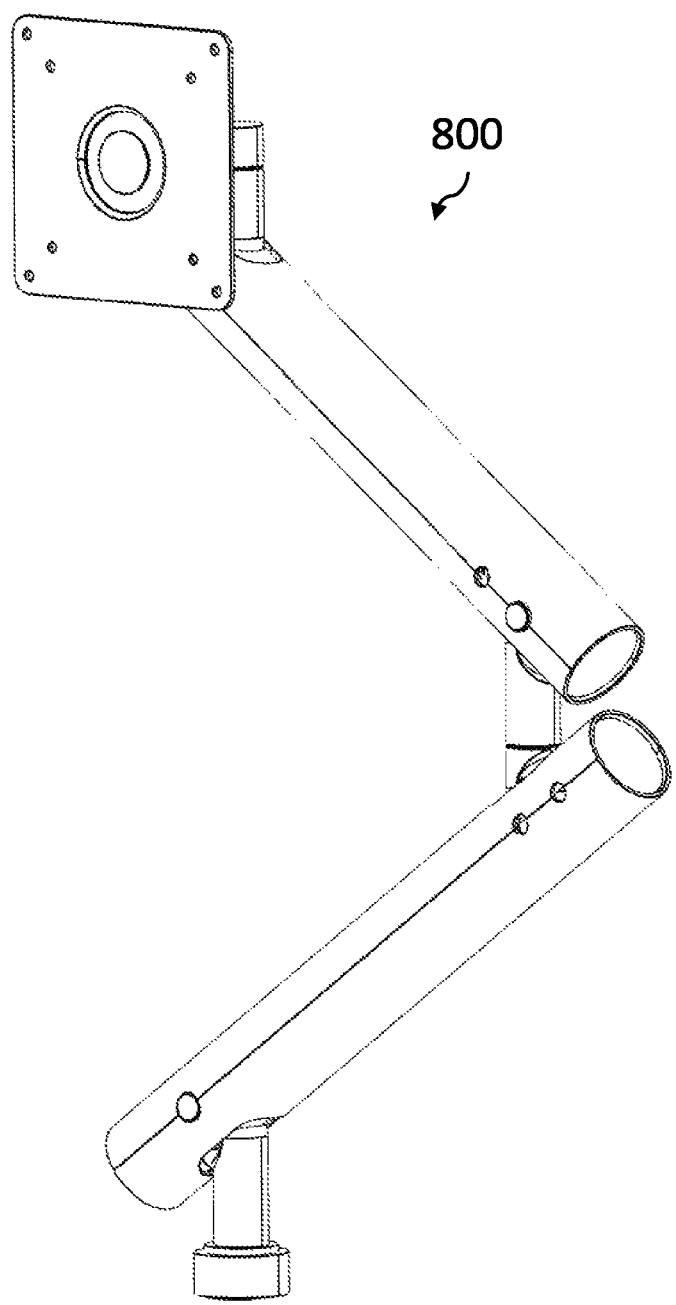
FIG. 8 is a front-right perspective view of the example support system of FIG. 1, in embodiments.
Figure 9:
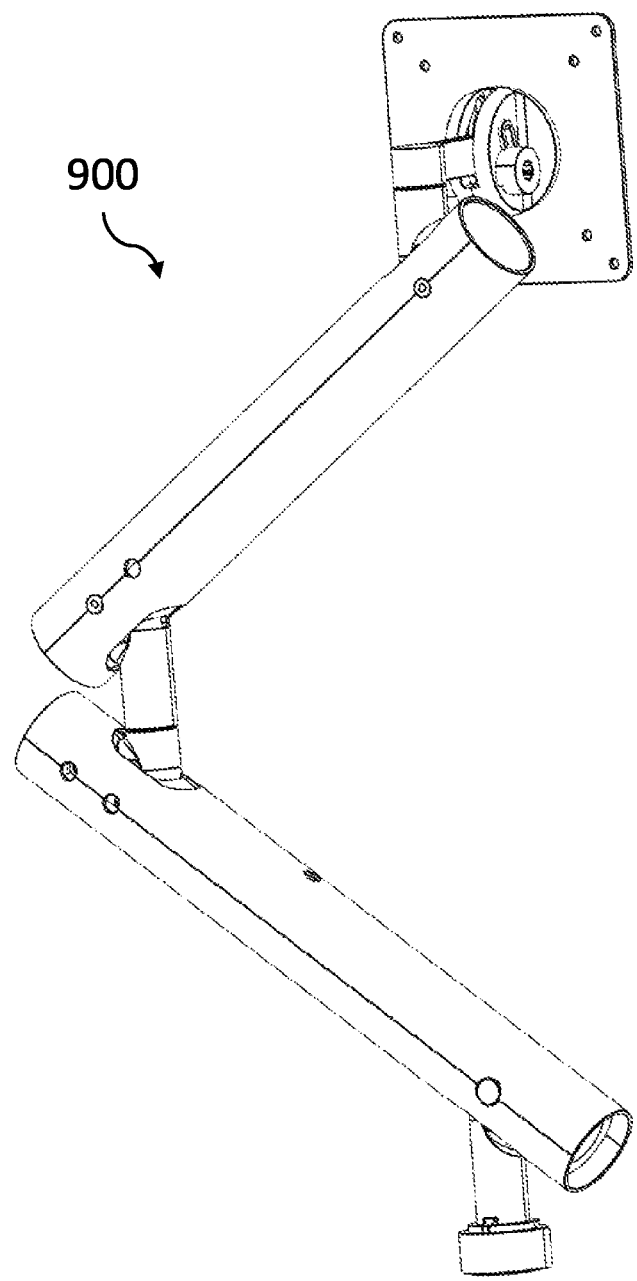
FIG. 9 is a rear-left perspective view of the example support system of FIG. 1, in embodiments.

FIG. 1 is a front elevational view of an example support system 100 for computing device displays. FIG. 2 is a rear elevational view of the example support system 100 of FIG. 1. FIG. 3 is a right side elevational view of the example support system 100 of FIG. 1. FIG. 4 is a left side elevational view of the example support system 100 of FIG. 1. FIG. 5 is a top plan view of the example support system 100 of FIG. 1. FIG. 6 is a bottom plan view of the example support system 100 of FIG. 1. FIG. 7 is a front-left perspective view of the example support system 100 of FIG. 1. FIG. 8 is a front-right perspective view of the example support system 100 of FIG. 1. FIG. 9 is a rear-left perspective view of the example support system 100 of FIG. 1.

In particular, the example support system 100 includes a base 110, a lower arm 108, a middle joint 106 (also may be referred to herein as a joint), an upper arm 104, and a display mount 102. The base 110 is configured to attach to a surface or structural support, such as a portion of a desk or desktop, a table or tabletop, or any other apparatus for which a user desires to mount a monitor. Other such examples may include a wall mount, a metal frame that is part of or separate from another piece of office furniture, etc. In this way, the entire support system 100 may be mounted to a desk or anywhere else the user desires using the base 110.

The base 110 is connected to the lower arm 108 near a proximate or first end of the lower arm 108. The base 110 and/or the lower arm 108 may be configured to allow the lower arm 108 to rotate with respect to the base 110 around an axis Y" as shown in FIGS. 1, 2, and 7. In addition, that rotation is also demonstrated in FIG. 6 as the direction H. In other words, the lower arm 108 may be rotated with respect to the base 110 around the axis Y" and in either direction along the direction H. The lower arm 108 may also be rotated a full 360 degrees in either direction H about the base 110 about the axis Y", providing maximum flexibility and customization to a user for adjusting a display mounted using the support system 100.

The base 110 and/or the lower arm 108 may also allow rotation of the lower arm 108 in the direction C as shown in FIGS. 1 and 2. In particular, this rotation of the lower arm 108 with respect to the base 110 may occur about an axis Z'" shown in FIGS. 3, 4, and 7. Where the base 110 is at a bottom of the support system 100 and the display mount 102 is at a top of the support system 100, the lower arm 108 may be at approximately a 45 degree angle in FIG. 1 with respect to the ground or a desktop surface to which the support system may be mounted. Stated another way, the lower arm 108 may be at a 135 degree angle with respect to a longitudinal axis of the base 110 (e.g., the axis Y"). The range of motion of the lower arm 108 in the rotational direction C about the axis Z'" may cause the lower arm 108 to move to positions with angles (with respect to the axis Y" of the base 110) of anywhere from 45 degrees to 170 degrees. For example, the lower arm 108 may be rotated about the axis Z'" to angular positions of 45 degrees, 50 degrees, 55 degrees, 60 degrees, 65 degrees, 70 degrees, 75 degrees, 80 degrees, 85 degrees, 90 degrees, 95 degrees, 100 degrees, 105 degrees, 110 degrees, 115 degrees, 120 degrees, 125 degrees, 130 degrees, 135 degrees, 140 degrees, 145 degrees, 150 degrees, 155 degrees, 160 degrees, 165 degrees, and/or 170 degrees.

The lower arm 108 is also connected to the middle joint 106. The lower arm 108 may also rotate with respect to the middle joint 106 in a direction B as shown in FIGS. 1 and 2. In particular, that rotational motion may be about an axis Z" as shown in FIGS. 3, 4, and 7. The angle of the lower arm 108 with respect to a longitudinal axis of the middle joint 106 (e.g., the axis Y') shown in FIG. 1 may be 135 degrees, for example. The range of motion of the lower arm 108 in the rotational direction B about the axis Z" may cause the lower arm 108 to move to positions with angles (with respect to the axis Y' of the middle joint 106) of anywhere from 45 degrees to 170 degrees. For example, the lower arm 108 may be rotated about the axis Z" to angular positions of 45 degrees, 50 degrees, 55 degrees, 60 degrees, 65 degrees, 70 degrees, 75 degrees, 80 degrees, 85 degrees, 90 degrees, 95 degrees, 100 degrees, 105 degrees, 110 degrees, 115 degrees, 120 degrees, 125 degrees, 130 degrees, 135 degrees, 140 degrees, 145 degrees, 150 degrees, 155 degrees, 160 degrees, 165 degrees, and/or 170 degrees. In this way, the middle joint 106 may function as, function similarly to, or include a first hinge where the middle joint 106 connects with the upper arm 104 and a second hinge where the middle joint 106 connects with the lower arm 108.

In addition, the middle joint 106 permits the upper arm 104 and the lower arm 108 to rotate with respect to one another about the axis Y' as shown in FIGS. 1, 2, and 7. Such motion may occur over a full range of 360 degrees. FIGS. 5 and 6 further demonstrate this rotational motion, as the bottom arm 108 may move in the rotational direction G about the axis Y', and the upper arm 104 may move in the similar rotational direction E about the axis Y'.

The middle joint 106 and/or the upper arm 104 may also be configured to permit rotational movement with respect to one another in the direction A shown in FIGS. 1 and 2 about an axis Z' shown in FIGS. 3, 4, and 7. The support system 100 components may be configured such that any rotational motion of the lower arm 108 with respect to the middle joint 106 may be mirrored automatically by the rotational motion of the upper arm 104 with respect to the middle joint 106 (or vice versa). As such, the lower arm 108 may rotate about the axis Z" in the direction B simultaneously and synchronously with rotational movement of the upper arm 104 about the axis Z' in the direction A. As such, the lower arm 108 and the upper arm 104 may generally maintain a same angle (though mirrored) with respect to the longitudinal axis of the middle joint (e.g., the axis Y'). As such, the range of motion of the upper arm 104 in the rotational direction A about the axis Z' may cause the upper arm 104 to move to positions with angles (with respect to the middle joint 106) of anywhere from 45 degrees to 170 degrees. For example, the upper arm 104 may be rotated about the axis Z' to angular positions of 45 degrees, 50 degrees, 55 degrees, 60 degrees, 65 degrees, 70 degrees, 75 degrees, 80 degrees, 85 degrees, 90 degrees, 95 degrees, 100 degrees, 105 degrees, 110 degrees, 115 degrees, 120 degrees, 125 degrees, 130 degrees, 135 degrees, 140 degrees, 145 degrees, 150 degrees, 155 degrees, 160 degrees, 165 degrees, and/or 170 degrees.

Figure 36:
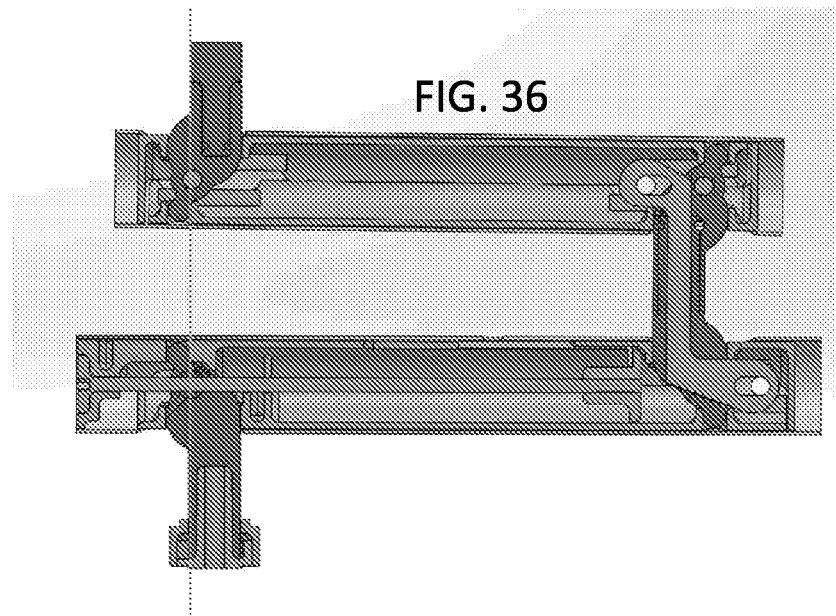
FIGS. 36-39 demonstrate a third example support system in various configurations demonstrating rotational motion of upper and lower arms with respect to a middle joint, in embodiments.
Figure 37:
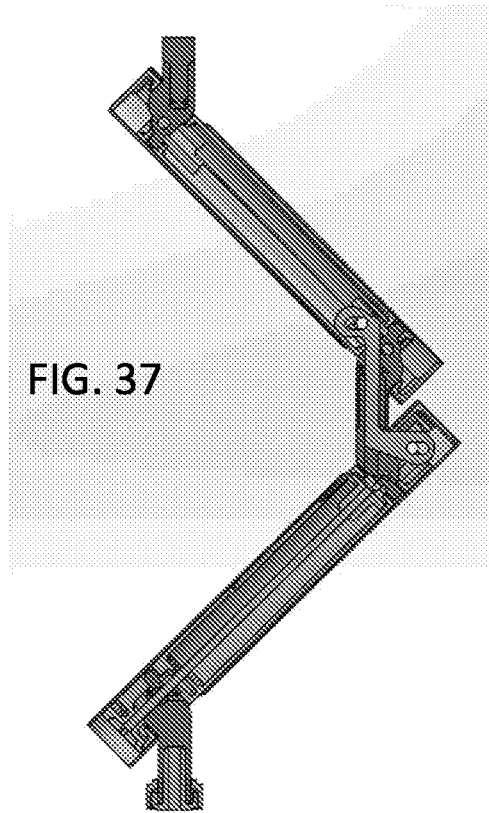
Figure 38:
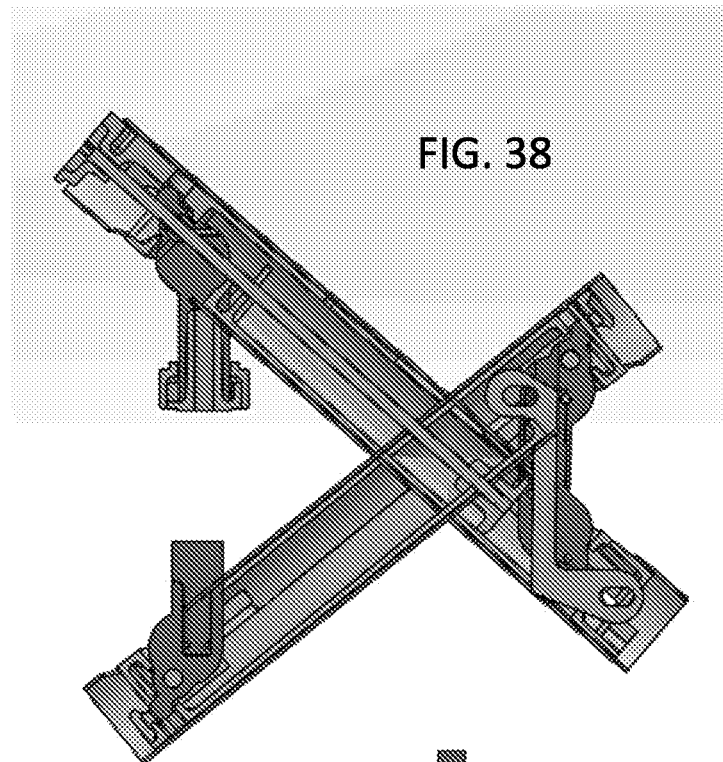
Figure 39:
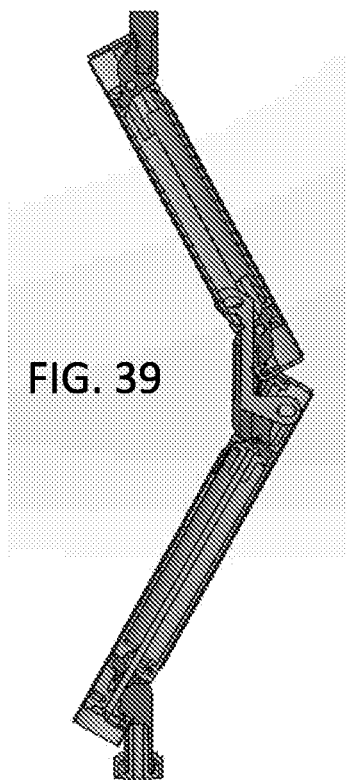

The range of motion described above for the upper arm 104 and the lower arm 108 with respect to the middle joint 106 is demonstrated in FIGS. 36-39. FIG. 36 shows that the upper arm 104 and the lower arm 108 may both move to a 90 degree angle with respect to the middle joint. FIG. 37 shows that the upper arm 104 and the lower arm 108 may both move to a 135 degree angle with respect to the middle joint. FIG. 38 shows that the upper arm 104 and the lower arm 108 may both move to a 45 degree angle with respect to the middle joint. FIG. 36 shows that the upper arm 104 and the lower arm 108 may both move to a 170 degree angle with respect to the middle joint.

Thus, the lower arm 108 and the upper arm 104 may rotate with respect to one another about the axis Y' in the directions G and E, respectively, a full 360 degrees. In addition, the lower arm 108 and the upper arm 104 may also rotate synchronously with respect to the middle joint 106 about the axes Z" and Z', respectively. This range of motion in various different directions, facilitated by the configuration of the middle joint 106 and its connections to the upper and lower arms 108 and 104, advantageously provides a high level of flexibility and ease of use for a user to place a monitor or display mounted using the support system 100. Each of the Z axes in FIGS. 3, 4, and 7 are also all orthogonal or perpendicular to each of the axes Y shown in FIGS. 1, 2, and 7. As such, the varied rotation about these axes facilitated by the support system 100 allows the user to move the display to various locations as desired in a three dimensional space (e.g., above or near their desktop or other work surface). In addition, each of the axes Z may be parallel to one another and each of the of the axes Y may be parallel to one another, regardless of the configuration the support system 100 is in or how the components thereof have been moved, positioned, or rotated.

As shown in FIG. 2, the upper arm 104 may also rotate in a direction D with respect to the display mount 102. This rotational motion may be about an axis Z"" shown in FIGS. 3 and 4. The upper arm 104 and the display mount 102 may rotate with respect to one another in the direction D anywhere from 20 degrees to 170 degrees. For example, the upper arm 104 may be rotated about the axis Z"" to angular positions of 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, 90 degrees, 95 degrees, 100 degrees, 105 degrees, 110 degrees, 115 degrees, 120 degrees, 125 degrees, 130 degrees, 135 degrees, 140 degrees, 145 degrees, 150 degrees, 155 degrees, 160 degrees, 165 degrees, and/or 170 degrees.

In addition, the display mount 102 may rotate with respect to the upper arm 104 about the axis Y'". The display mount 102 and the upper arm 104 may rotate with respect to one another in 360 degrees of motion in the direction F shown in FIG. 5. In this way, the user may position and point a display or monitor mounted to the display mount 102 in a desired manner.

Furthermore, the upper arm 104 and the lower arm 108 may therefore be rotatable about the axes Z' and Z", respectively, such that even while moving rotationally with respect to the middle joint 106, the upper arm 104 and the lower arm may move within or along a same plane. For example, if a user pushed down on the top of the upper arm 104 or on the display mount 102 as the support system 100 is configured in FIGS. 1-9, the upper and lower arms 104 and 108 would move synchronously and simultaneously closer together (e.g., reducing each respective angle formed with the middle joint 106) within or along the same plane. In contrast, if, for example, the upper arm 104 was rotated about the axis Y' 90 degrees relative to the lower arm 108 from the upper arm 104's original position as shown in FIGS. 1-9, the upper and lower arms would still move synchronously and simultaneously (including reducing their respective angles relative to the middle joint 106), but such movement would not occur in the same plane. Advantageously, this allows a user to adjust the height of a display using the support system 100 either within a plane shared by the upper and lower arms 104 and 108 (e.g., if the user wants to raise or lower the height of the display mount 102 from where it is located in FIGS. 1-9), and allows a user to adjust the height of the display using the support system 100 and a location over a desktop by causing the upper and lower arms 104 and 108 to move in different planes as described herein.

FIG. 10 is a front side elevational view of the lower arm 108 and base 110 of the example support system 100 of FIG. 1. FIG. 11 is a perspective view of the base 110 of the example support system 100 of FIG. 1. FIG. 12 is a first exploded perspective view of the base 110 of the example support system 100 of FIG. 1. FIG. 13 is a second exploded perspective view of the base 110 of the example support system 100 of FIG. 1.

In particular, FIG. 11 shows a close-up perspective view of the base 110 of the support system 100. The base 110 includes a base mount 1106, a sleeve 1104, and a base joint 1102. FIGS. 12 and 13 show two different exploded perspective views of these components.

The base mount 1106 may be used to mount the support system 100 to a desk, counter, office furniture, metal frame, or any other object to which a user desires to mount the support system 100. The base joint 1102 includes a protrusion 1202 that fits into an opening 1204 of the sleeve 1104. The sleeve 1104 therefore may fit around a bottom portion of the base joint 1102 and the base mount 1106. Because the protrusion 1202 will interfere with the side walls of the opening 1204 of the sleeve 1104, the sleeve 1104 and the base joint 1102 are effectively locked to one another when the base 110 is assembled. Thus, the sleeve 1104 and the base joint 1102 together may rotate with respect to the base mount 1106. In this way, the entire support system 100

(excepting the base mount 1106) may rotate about the base mount 1106 as desired (and as describe above about the axis Y" in the direction H).

The base joint 1102 includes other elements that are shown in and discussed further below with respect to FIGS. 14-17. In particular, the base joint 1102 includes openings 1110 and 1112 pass through the width of the base joint 1102, albeit in different directions. A portion of the openings 1110 and 1112 also intersect within the base joint 1102, so there is an opening within the base joint 1102 associated with both of the openings 1110 and 1112. The base joint 1102 also includes a protrusion 1114.

FIG. 14 is a front side elevational view of the lower arm 108 and the middle joint 106 of the example support system 100 of FIG. 1. FIG. 15 is a cross-sectional view of the lower arm 108 and the middle joint 106 of the example support system 100 of FIG. 1. FIG. 16 is a first exploded perspective view of the lower arm 108 of the example support system 100 of FIG. 1. FIG. 17 is a second exploded perspective view of the lower arm 108 of the example support system 100 of FIG. 1.

FIG. 14 demonstrates the base joint 1102, the lower arm 108, and the middle joint 106. The base joint 1102 and the lower arm 108 may connect at a pin 1404 (forming a hinge), and the lower arm 108 and the middle joint 106 may connect at a pin 1402 (forming a hinge). The pins 1402 and 1404 may align with the axes Z" and Z'" of FIGS. 3, 4, and 7, respectively.

As shown in FIGS. 15-17, the lower arm 108 may include an outer casing 1502. The outer casing 1502 may be formed as a single piece or may be a two-part casing whose two halves are joined together by a screw and nut coupling, welding, or any other fastening methods. The outer casing 1502 includes openings to accommodate the pins 1402 and 1404, as well as openings to accommodate ends of the base joint 1102 and the middle joint 106. Within the outer casing 1502 is a sliding carriageway or spring slider 1504 supported within the outer casing 1502. The spring slider 1504 may have two parts 1602 and 1604, and the spring slider 1504 has a first opening 1528 that accommodates and locks the protrusion 1114 of the base joint 1102 in place, as well as a second opening 1530 that accommodates and locks a protrusion 1516 of the middle joint 106 in place. Accordingly, the spring slider 1504 may move along a longitudinal axis of the lower arm 108 without a component of movement perpendicular thereto. While the described embodiments have the spring slider 1504 inside the support arm, the spring slider 1504 or a similar spring slider may be arranged around or alongside the lower arm 108 provided that it moves along or parallel to the longitudinal axis of the lower arm 108. Because the protrusions 1528 and 1530 are locked into place with respect to the spring slider 1504, the protrusions 1528 and 1530 will cause the spring slider 1504 to slide within the outer casing 1502 when the lower arm 108 rotates about the Z" and Z'" axes as described herein. This, in turn, causes a force from a compression spring 1508 discussed below to be applied to the middle joint 106, supporting a weight of a monitor or display, for example, mounted to the support system 100.

The spring slider 1504 includes a compression spring 1508 inside it which engages at its distal end with a spring nut plate 1510 mounted on a distal end of a force adjusting screw 1506. At initial set up or final manufacture of the support system 100, the force adjusting screw 1506 may be set to define a particular separation between the spring nut plate 1510 and the proximal end of the spring slider 1504 (where the proximal end of the slider 1504 is the end nearer to the base joint 1102 than the middle joint 106). This separation defines a length of the space for the compression spring 1508 and hence determines the force supplied by the spring 1508. The force adjusting screw 1506 may adjust a position of the spring nut plate 1510 within the spring slider 1504 and thereby increase or decrease the length of the compression spring 1508 and hence, respectively, decrease or increase the force that compression spring 1508 will apply to the spring slider 1504 and the spring nut plate 1510, and hence to the protrusion 1516 pivotally held in place within the opening 1530 of the spring slider 1504 and against which the compression spring 1508 ultimately acts.

As the lower arm 108 pivots about the pin 1402 about the axis Z", the protrusions 1114 and 1516 push or pull the spring slider 1504 in the outer casing 1502 towards or away from the middle joint 106 (depending on which direction the lower arm is being rotated). The force applied from the compression spring 1508 (assuming the compression spring, the spring nut plate 1510, and the force adjusting screw 1506 are adequately calibrated) therefore keeps the desired orientation between the lower arm 108 and the middle joint 106, without a weight of a monitor or display mounted on the support system 100 causing the middle joint 106 to move downward and causing corresponding rotation of the lower arm 108.

The force adjusting screw 1506 passes through the opening 1110 of the base joint 110, as well as through a hole in the pin 1404. The pin 1404 passes through the opening 1112 of the base joint 110. An end of the force adjusting screw 1506 is accessible to a user to calibrate the force applied by the compression spring 1508 at the end the part 1602 of the spring slider 1504.

A sliding indicator 1526 may slide and have markings thereon (e.g., printed numbers) according to the spring compression setting as adjusted using the force adjusting screw 1506. In this way, a user may see a degree to which the spring compression is set and/or adjusted as the sliding indicator 1526 slides with respect to the outer casing 1502 as compression of the spring 1508 changes.

Figure 18:
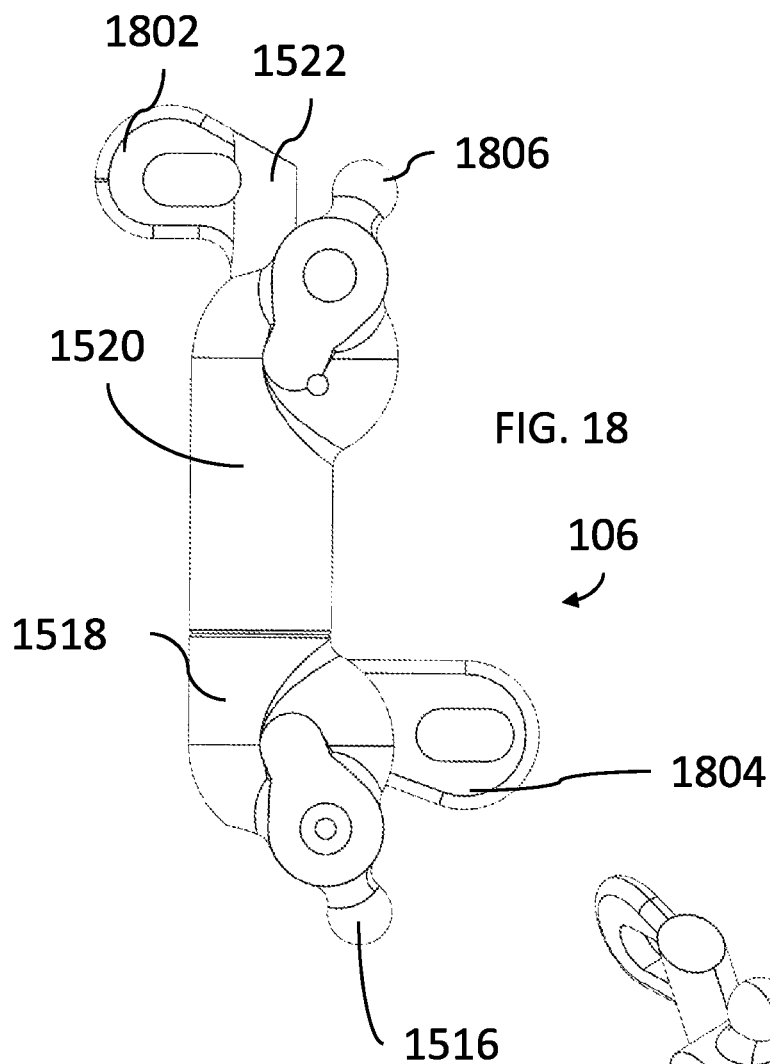
FIG. 18 is a front side elevational view of the middle joint of the example support system of FIG. 1, in embodiments.
Figure 19:
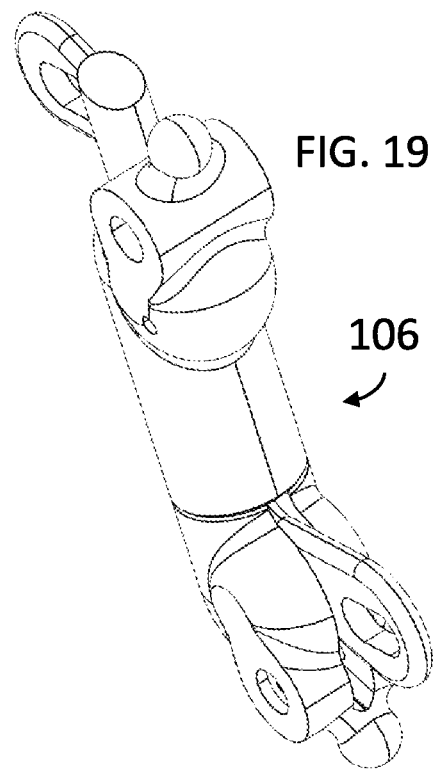
FIG. 19 is a front-right perspective view of the middle joint of the example support system of FIG. 1, in embodiments.

The middle joint 106 is also shown in FIG. 15 and is shown in and discussed in further detail with respect to FIGS. 18-21. FIG. 18 is a front side elevational view of the middle joint 106 of the example support system 100 of FIG. 1. FIG. 19 is a front-right perspective view of the middle joint 106 of the example support system 100 of FIG. 1. FIG. 20 is a first exploded perspective view of the middle joint 106 of the example support system 100 of FIG. 1. FIG. 21 is a second exploded perspective view of the middle joint 106 of the example support system 100 of FIG. 1.

The middle joint 106 includes an upper coupling 1520 and a lower coupling 1518. The upper coupling 1520 and the lower coupling 1518 are rotatable with respect to one another about the longitudinal axis of the middle joint 106 (e.g., the axis Y'). The lower coupling 1518 is configured to connect to the lower arm 108, as shown at least in FIG. 15. The upper coupling 1520 is configured to connect to the upper arm 104, as shown at least in FIG. 23. Because the protrusion 1516 is offset from the pin 1402, the compression spring 1508 can apply a rotational force to the lower coupling 1518 of the middle joint 106 via the spring slider 1504 to keep the middle joint from moving under the weight of a monitor or other display.

Figure 23:
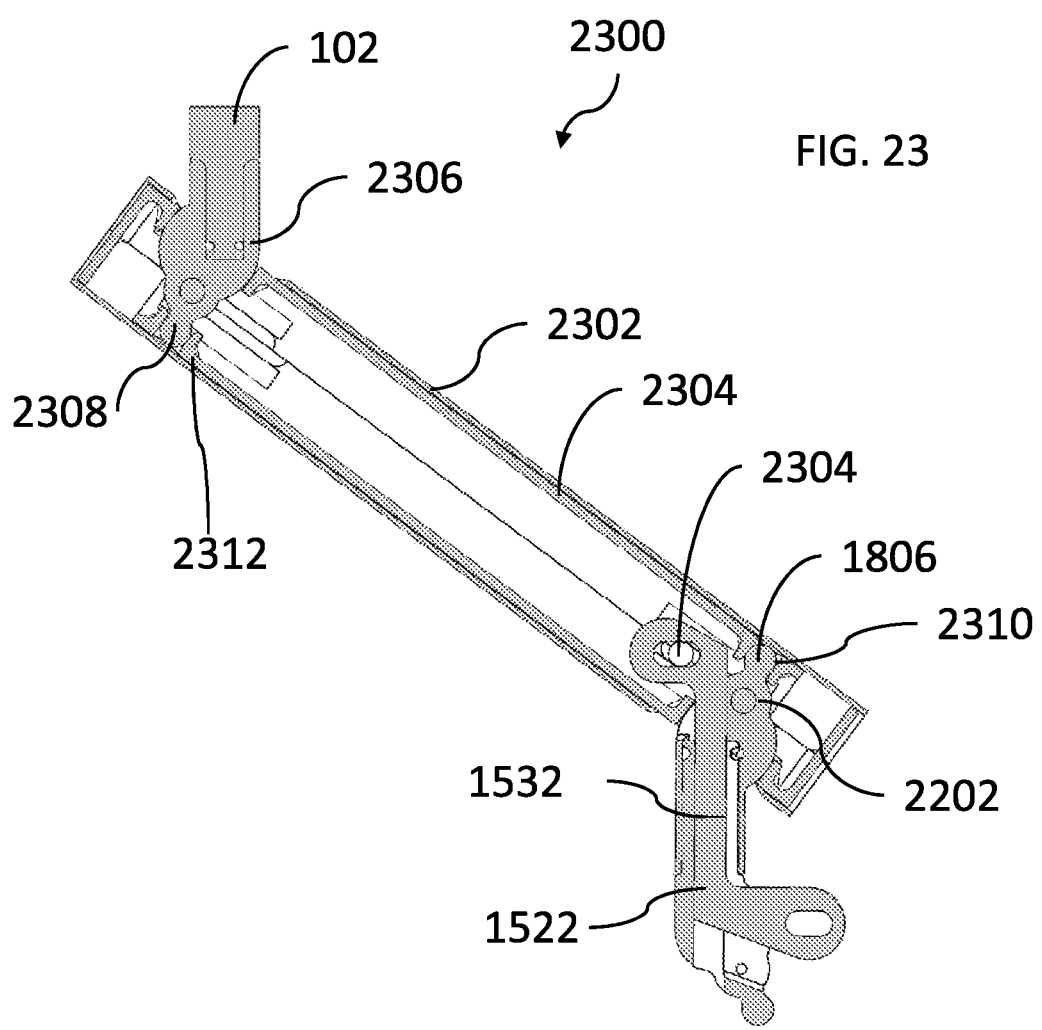
FIG. 23 is a cross-sectional view of the middle joint, the upper arm, and the portion of the display mount of the example support system of FIG. 1, in embodiments.

Similarly, a protrusion 1806 of the upper coupling 1520 fits into an opening 2310 of a slider 2304 of the upper arm 104, as shown in FIG. 23. Similar to the spring slider 1504, the slider 2304 may be composed of two parts 2402 and 2404, and the slider 2304 may slide within an outer casing 2302. The protrusion 1806 can rotate in the opening 2310 and exert a rotational force on the slider 2304 when the upper arm 104 rotates with respect to the middle joint 106 about the axis Z' because the protrusion 1806 is offset from a pin 2202 where the upper arm 104 rotates about the middle joint 106. As such, force from the compression spring 1508 may be translated from the lower arm 108 through the middle joint 106 to the slider 2304 of the upper arm 104. Thus, the upper arm 104 may not have a compression spring. The slider 2304 also exerts this force in turn on a protrusion 2308 of a display mount joint 2306 in an opening 2312. As such, the force applied from the compressive spring 1508 may keep each joint in the support system 100 from moving on its own under a weight of a monitor or other display attached to the display mount 102 (e.g., prevent the upper arm 104 and the lower arm 108 from rotating with respect to the joints of the support system). The portion of the display mount 120 shown in FIG. 23 may rotate with respect to the display mount joint 2306, providing further adjustability for a monitor or display mounted thereon.

Figure 22:
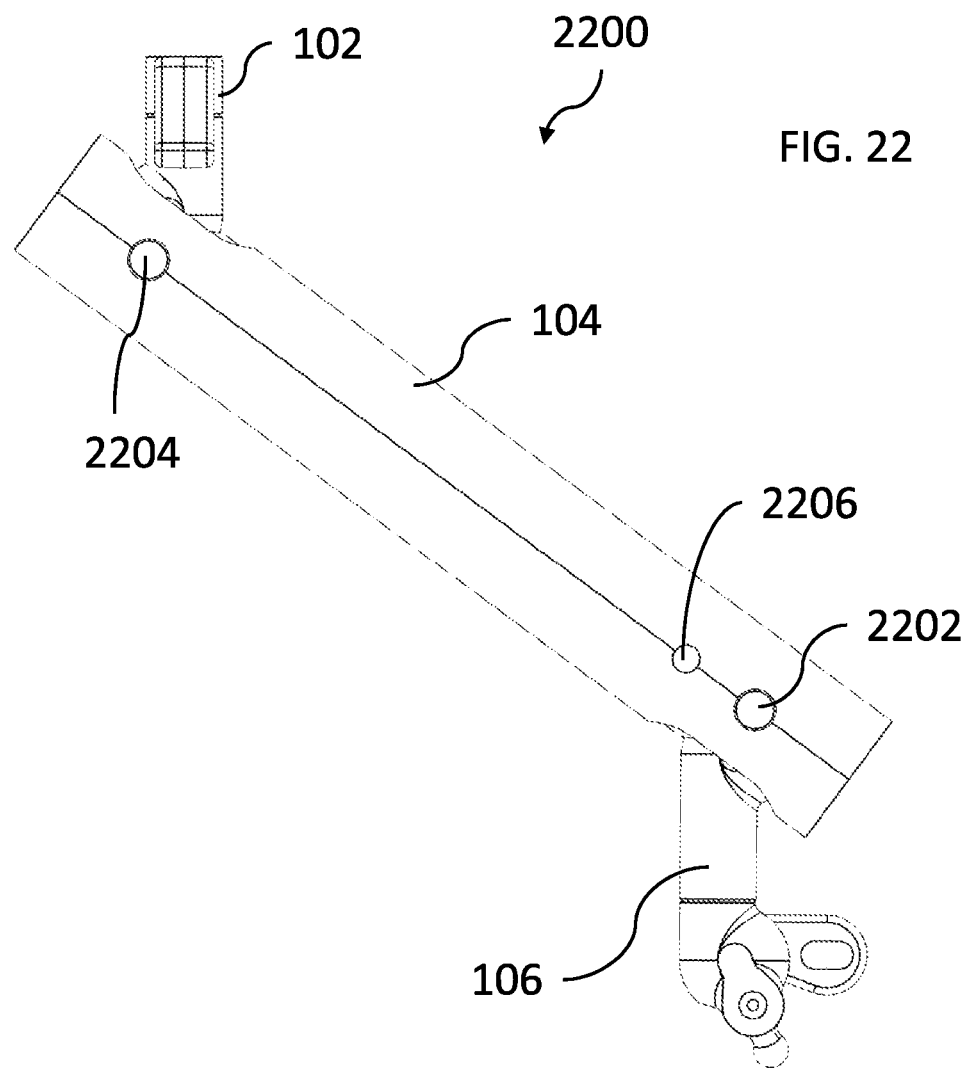
FIG. 22 is a front side elevational view of the middle joint, an upper arm, and a portion of a display mount of the example support system of FIG. 1, in embodiments.
Figure 24:
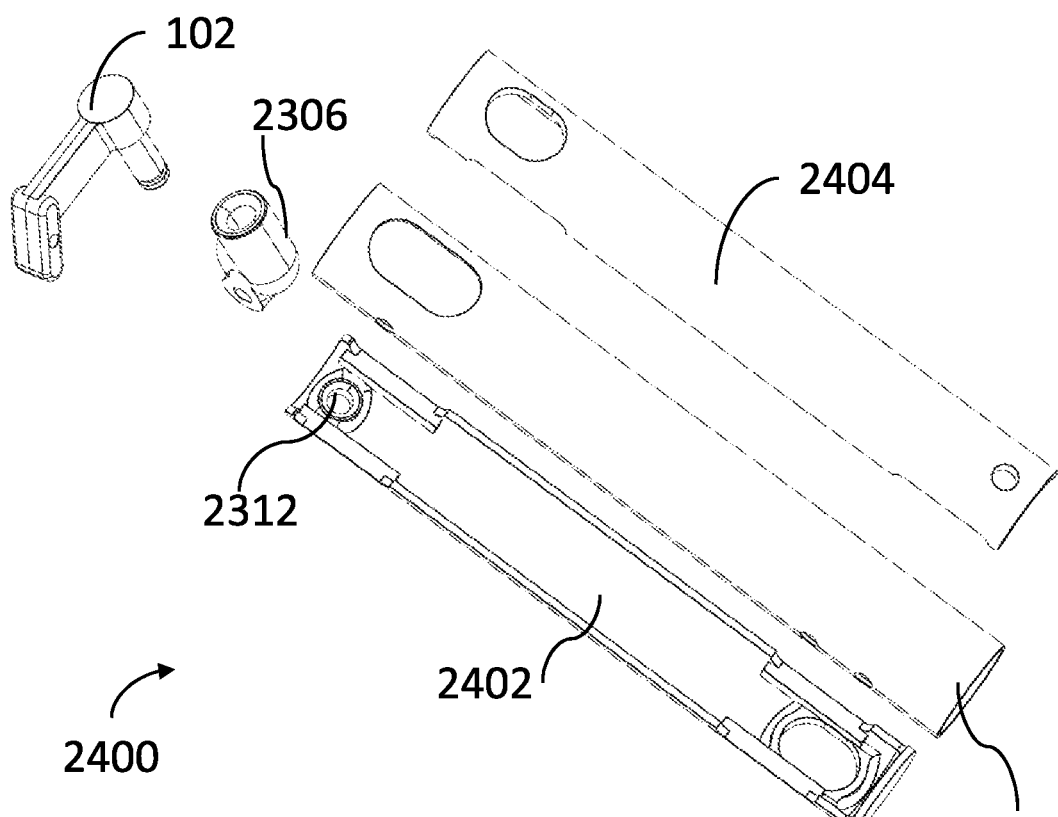
FIG. 24 is a first exploded perspective view of the upper arm and the portion of the display mount of the example support system of FIG. 1, in embodiments.
Figure 25:
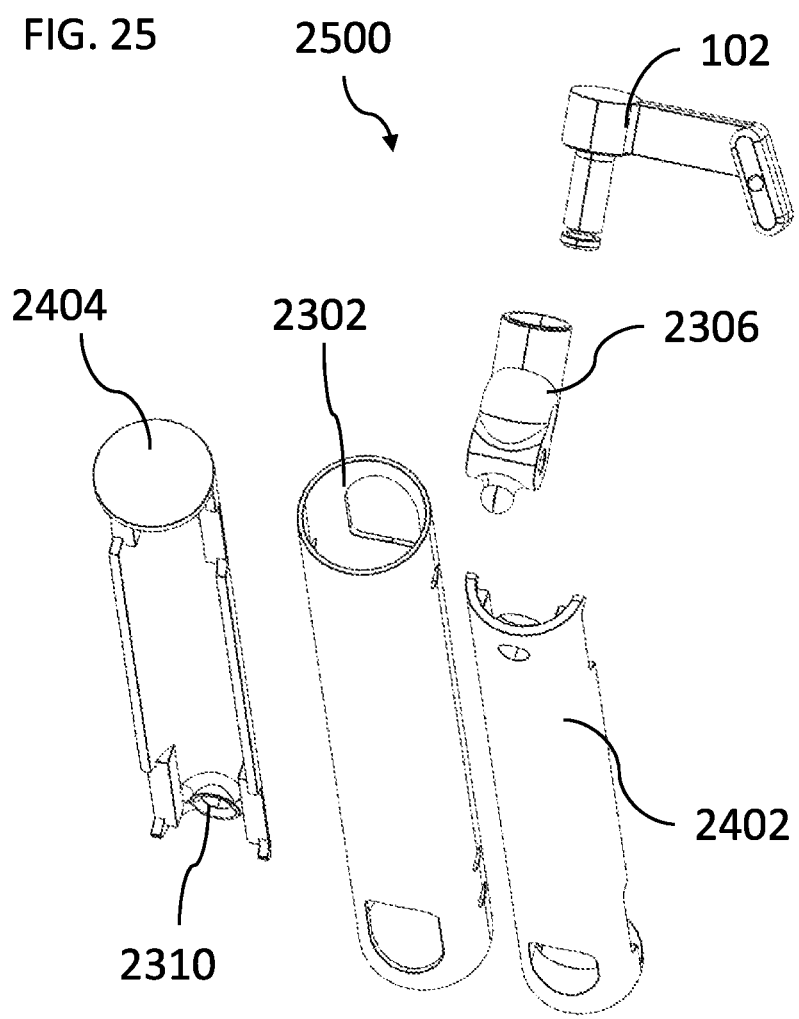
FIG. 25 is a second exploded perspective view of the upper arm and the portion of the display mount of the example support system of FIG. 1, in embodiments.

FIG. 22 is a front side elevational view of the middle joint 106, the upper arm 104, and a portion of a display mount 102 of the example support system 100 of FIG. 1. FIG. 23 is a cross-sectional view of the middle joint 106, the upper arm 104, and the portion of the display mount 102 of the example support system 100 of FIG. 1. FIG. 24 is a first exploded perspective view of the upper arm 104 and the portion of the display mount 102 of the example support system 100 of FIG. 1. FIG. 25 is a second exploded perspective view of the upper arm 104 and the portion of the display mount 102 of the example support system 100 of FIG. 1.

Referring at least to FIGS. 15 and 18-23 with respect to the middle joint 106, upper coupling 1520 and the lower coupling 1518 may rotate with respect to one another about the axis Y'. In addition, the middle joint 106 may further include a vertical force translation member 1522, which may include an upper and lower portion that rotate with respect to one another at a link 1532. The vertical force translation member 1522 may fit between and be secured by the upper and lower couplings 1518 and 1520 of the middle joint 106. The lower coupling 2102 includes a slot 2102 so that the vertical force translation member 1522 may be inserted into the lower coupling 2102 during assembly of the support system 100. The vertical force translation member 1522 is connected to the outer casing 1502 of the lower arm 108 by a pin 1406, and the vertical force translation member 1522 is connected to the outer casing 2302 of the upper arm 104 by a pin 2304.

Because the vertical force translation member 1522 is connected to the outer casings 1502 and 2302 of the upper and lower arms 104 and 108, respectively, the vertical force translation member 1522 translates any vertical movement and force from the upper arm 104 to the lower arm 108. In contrast, the upper and lower couplings 1518 and 1520 are connected the spring slider 1504 and the slider 2304, respectively, the upper and lower couplings 1518 and 1520 may not adequately translate vertical force or movement from the upper arm 104 to the lower arm 108 because the spring slider 1504 and the slider 2304 may slide within their respective outer casings 1502 and 2302.

However, by virtue of the vertical force translation member 1522's connection to the outer casings 1502 and 2302, vertical motion and force (e.g., by a user pushing downward on the upper arm 104) may be translated from the upper arm 104 to the lower arm 108. This assists in effecting the synchronous and simultaneous mirrored movement of the upper and lower arms 104 and 18 described herein.

Furthermore, because the upper and lower arms 104 and 108 (together with the upper and lower couplings 1518 and 1520) may rotate with respect to one another about the axis Y', the vertical force translation member 1522 may rotate at the link 1532. Like the rotation of the upper and lower arms 104 and 108 about the axis Y', the vertical force translation member 1522 may also rotate 360 degrees about the axis Y' (or at least about a vertical axis associated with the vertical force translation member 1522 that is parallel to the axis Y').

As such, the upper coupling 1520 generally permits rotation of the upper arm 104 with respect to the upper coupling 1520 about the axis Z' and prevents rotation of the upper arm 104 with respect to the upper coupling 1520 about a longitudinal axis of the middle joint 106 (e.g., the axis Y'). Similarly, the lower coupling 1518 permits rotation of the lower arm 108 with respect to the lower coupling 1518 about the axis Z" and prevents rotation of the lower arm 108 with respect to the lower coupling 1518 about the longitudinal axis of the middle joint 106 (e.g., the axis Y').

Figure 26:
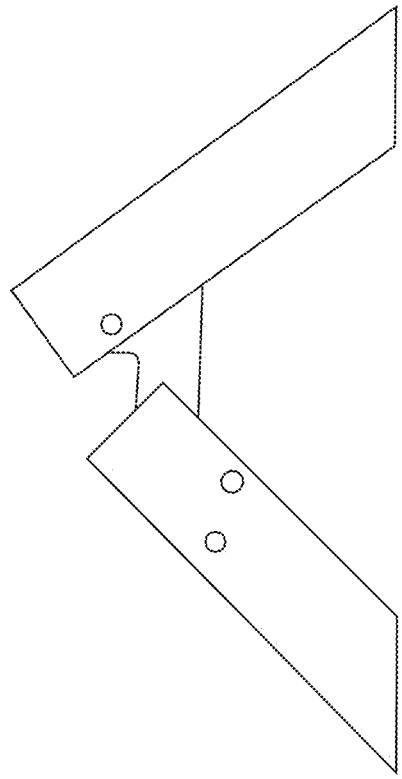
FIGS. 26-28 demonstrate a second example support system in various configurations having upper and lower arms generally within a vertical plane and overlapping one another within that vertical plane, in embodiments.
Figure 27:
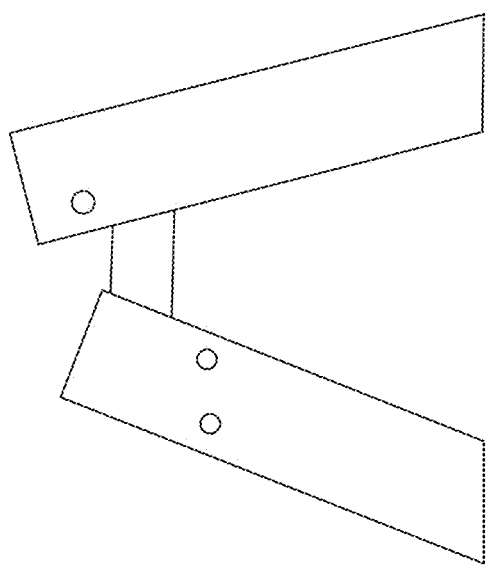
Figure 28:
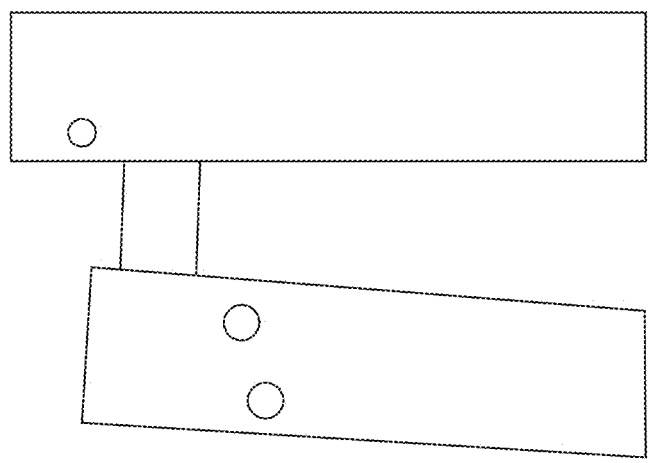

FIGS. 26-28 demonstrate a second example support system in various configurations having upper and lower arms generally within a vertical plane and overlapping one another within that vertical plane, in embodiments. In particular, FIG. 26 shows an upper arm and a lower arm connected by a middle joint. The upper arm and lower arm are configured such that pressing down on the upper arm will generally cause the upper and lower arms to move generally within a same plane (as shown in FIGS. 27 and 28). In addition, upper and lower arms are generally overlapping one another in that vertical plane.

FIG. 27 shows the upper arm starting to be pressed down, which causes the lower arm to simultaneously and synchronously mirror the movement of the upper arm, such that the upper and lower arms maintain a similar or the same angle with respect to the middle joint. As also discussed above, the upper and lower arms moved from the position in FIG. 26 to the position in FIG. 27 within a vertical plane. FIG. 28 shows the upper and lower arms after the upper arm is further pressed down, and the two arms have again moved in a synchronous and mirrored fashion such that each arm still maintains the same or a similar angle with respect to the middle joint.

Figure 29:
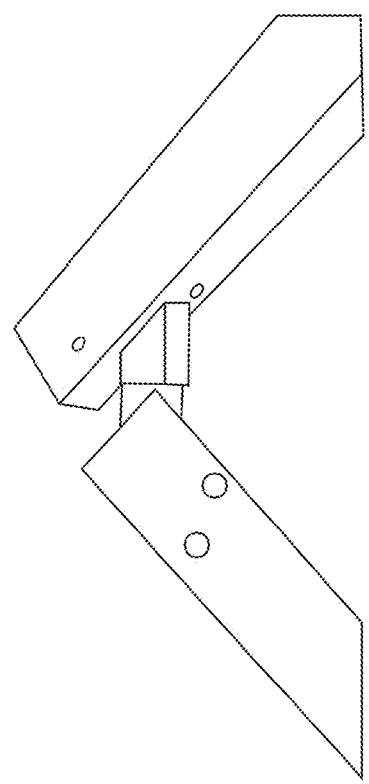
FIGS. 29-31 demonstrate the second example support system of FIG. 26 in various configurations where the upper and lower arms in different vertical planes, in embodiments.
Figure 30:
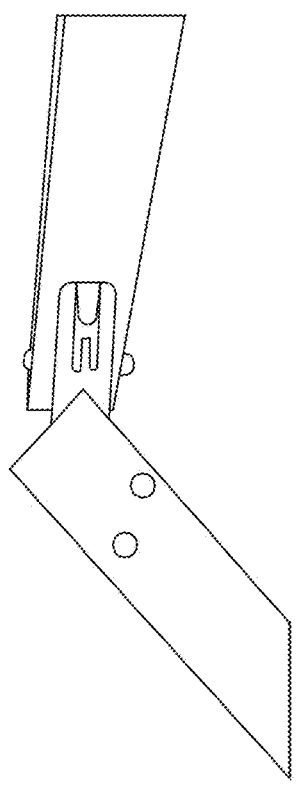
Figure 31:
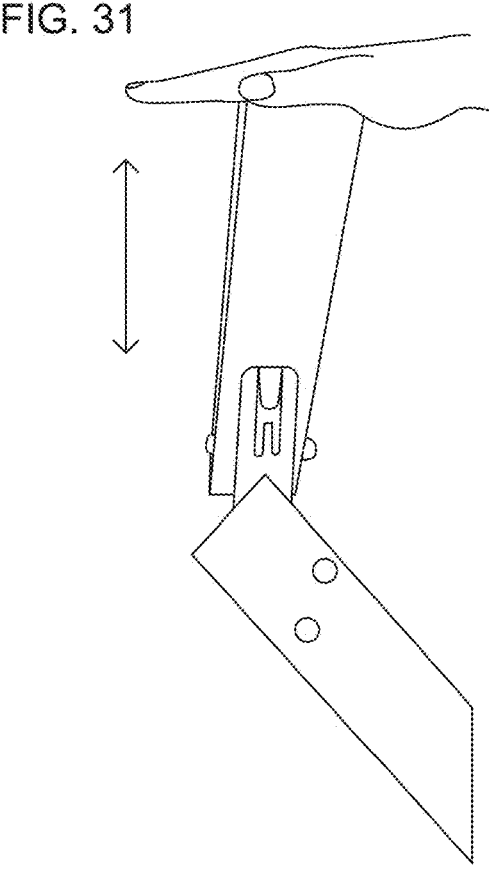

FIGS. 29-31 demonstrate the second example support system of FIG. 26 in various configurations where the upper and lower arms in different vertical planes, in embodiments. FIG. 29 demonstrates that the upper arm may be rotated with respect to the lower arm such that the upper and lower arms no longer extend within a same plane (e.g., the upper arm has been rotated about the axis Y' described above approximately 45 degrees from its position in FIG. 26).

FIG. 30 demonstrates that the upper arm may continue to be rotated about a longitudinal axis of the middle joint (e.g., the axis Y' described above). While the upper arm may rotate 360 degrees about the longitudinal axis of the middle joint, FIG. 30 shows the upper arm having moved approximately 90 degrees as compared to its original position in FIG. 26. FIG. 31 further shows that the upper arm may be pushed down by a user, causing the simultaneous and synchronized movement of the upper and lower arms with respect to the middle joint, even though the movement of the upper and lower arms is no longer within a same vertical plane.

Figure 32:
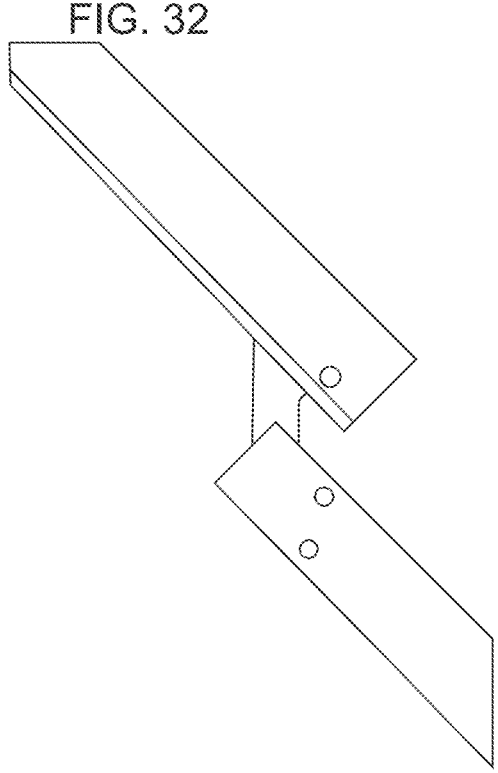
FIGS. 32-34 demonstrate the second example support system of FIG. 26 in various configurations where the upper and lower arms are generally within the vertical plane but generally do not overlap one another within that vertical plane, in embodiments.
Figure 33:
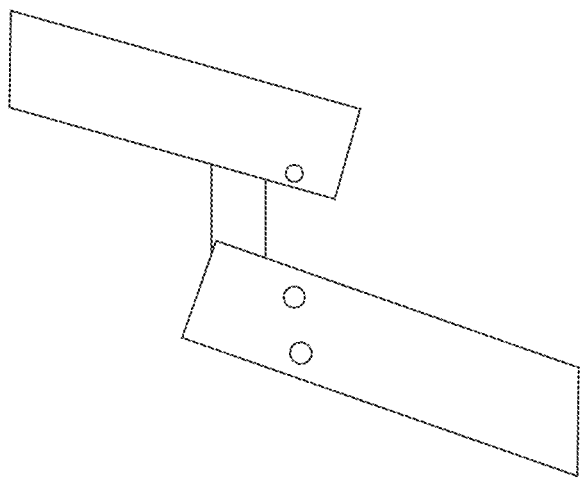
Figure 34:
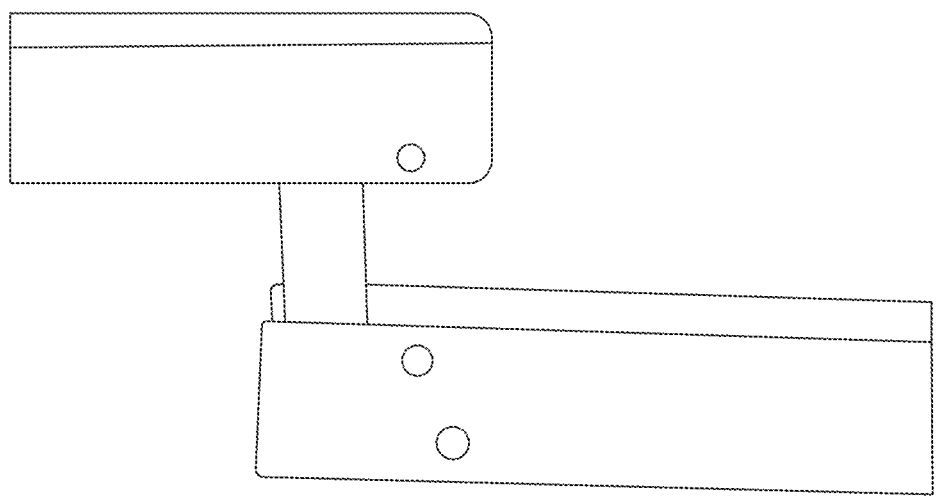
Figure 35:
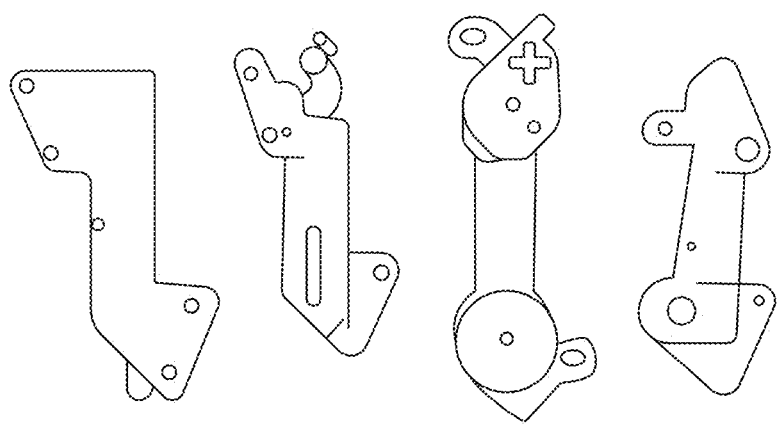
FIG. 35 demonstrates additional example middle joints for use in support systems, in embodiments.

FIGS. 32-34 demonstrate the second example support system of FIG. 26 in various configurations where the upper and lower arms are generally within the vertical plane but generally do not overlap one another within that vertical plane, in embodiments. FIG. 32 demonstrates that the upper arm may be rotated an additional 90 degrees beyond the position demonstrated in FIG. 30 (and 180 degrees from the position of the upper arm in FIG. 26). As the upper arm is pressed down by a user in FIGS. 33 and 34, the upper and lower arms move within a same plane, and synchronously and simultaneously as described herein. This occurs even though a majority of the upper and lower arms do not overlap one another within that vertical plane as in the example shown in and described with respect to FIGS. 26-28.

While various example embodiments described herein provide for upper and lower arms to rotate about a joint simultaneously and synchronously, such that rotational motion of the upper and lower arms about the joint mirrors one another, various embodiments may also configure the upper and lower arms to move or rotate independently of one another. In other various embodiments, the upper and lower arms may move simultaneously, but their motion may not be synchronized to mirror each other. That is, the joint and upper and lower arms may be configured to cause the upper and lower arms to rotate about the joint simultaneously but at different angular rates from one another. In any case, even if the upper and lower arms move independently or move simultaneously but not perfectly mirrored with respect to one another, the upper and lower arms may still move and/or rotate about the various axes and in the various directions described herein (e.g., as shown in and described with respect to FIGS. 1-7 and 26-34). In addition, the various embodiments shown in the figures show upper and lower arms of equal length. However, in various embodiments, the upper and lower arms may have different lengths to achieve different desired positions for a computing display mounted using the support systems described herein (e.g., the upper arm being longer than the lower arm, the upper arm being shorter than the lower arm).

FIG. 35 demonstrates additional example middle joints for use in support systems as described herein throughout. Furthermore, the embodiments described herein are each examples of a support system, and fewer, additional, or different components to those specifically described herein may be used in various embodiments of the support system. In addition, the support system components may be formed of or otherwise made from any type of material desired, such as metal, plastic, rubber, wood, etc. As described herein, a vertical force translation member (e.g., the vertical force translation member 1522 described herein) may have a two piece construction including an upper and lower portion that rotate with respect to one another at a link (e.g., the link 1532). In various embodiments, a joint may be used that has a single piece construction, such as the two joints shown on the left of FIG. 35. In such embodiments, the vertical force translation member may be, for example, a straight pin that is configured to rotate within a joint and still translate vertical motion.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A support for a computing device display comprising:
    a base having a longitudinal axis (Y''') and being configured to attach to a surface or structural support such that said longitudinal axis (Y''') extends upwardly from said surface or structural support;
    a lower arm having a lower arm first end mounted to the base for rotation about a lower arm first end axis (Z''') orthogonal to the longitudinal axis (Y''') of the base, the lower arm also having a lower arm second end;
    an upper arm having an upper arm first end and an upper arm second end;
    a display support mounted to the upper arm second end for rotation about a display support axis (Z'''') parallel to the lower arm first end axis (Z''');
    a middle joint having a longitudinal axis (Y') parallel to the longitudinal axis of the base (Y'''), the middle joint connecting the lower arm second end and the upper arm first end,
    wherein:
        the upper arm and the lower arm are rotatable with respect to one another about said longitudinal axis (Y') of the middle joint,
        the upper arm first end is rotatable with respect to the joint about an upper arm first end axis (Z') orthogonal to the longitudinal axis (Y') of the joint and parallel to the lower arm first end axis (Y'') and the display support axis (Z''''),
        the lower arm second end is rotatable with respect to the middle joint about a lower arm second end axis (Z'') orthogonal to the longitudinal axis (Y') of the joint and parallel to the lower arm first end axis (Y'') and the display support axis (Z''''),
    and wherein the support further comprises:
        an adjustable counterbalance mechanism associated with the lower arm, said adjustable counterbalance mechanism being adjustable to apply a counterbalance force to the middle joint and to the display support via the upper arm to counterbalance a computing device display connected to the display support to prevent movement of the support under the weight of a computing device display connected to the display support, and
        a vertical force translation member housed within the middle joint, the vertical force translation member being configured such that when a user applies a force that overcomes the counterbalance force to one of the upper and lower arms at least partially in a direction parallel to the longitudinal axis of the middle joint to move the upper or lower arm to which the force is applied, the vertical force translation member is configured to translate said force to the other of the upper and lower arms to effect the synchronous and simultaneous mirrored movement of the upper and lower arms.

2. The support of claim 1, wherein the upper arm and the lower arm are rotatable 360 degrees with respect to one another about the longitudinal axis of the middle joint.

3. The support of claim 1, wherein the middle joint further comprises an upper coupling and a lower coupling rotatable with respect to one another about the longitudinal axis of the joint, and further wherein:
    the upper coupling is connected to the upper arm first end,
    the lower coupling is connected to the lower arm second end,
    the upper coupling permits rotation of the upper arm with respect to the upper coupling about the upper arm first end axis (Z') and prevents rotation of the upper arm with respect to the upper coupling about the longitudinal axis (Y') of the middle joint, and
    the lower coupling permits rotation of the lower arm with respect to the lower coupling about the lower arm second end axis (Z'') and prevents rotation of the lower arm with respect to the lower coupling about the longitudinal axis (Y') of the middle joint.

4. The support of claim 3, wherein the lower coupling is configured to connect to a spring slider within a housing of the lower arm, wherein the spring slider is configured to slide within the housing of the lower arm.

5. The support of claim 3, wherein the upper coupling is configured to connect to a slider within a housing of the upper arm, wherein the slider is configured to slide within the housing of the upper arm.

6. The support of claim 1, wherein, while supporting the computing display device, the longitudinal axis (Y') of the middle joint is oriented generally parallel to a gravitational force.

7. The support of claim 1, wherein:
   the upper arm is rotatable about the upper arm first end axis (Z') and the lower arm is rotatable about the lower arm second end axis (Z") within a same plane, and
   the upper arm is rotatable about the upper arm first end axis and the lower arm is rotatable about the lower arm second end axis within different planes.

* * * * *